(12) United States Patent
Motahari et al.

(10) Patent No.: US 8,504,481 B2
(45) Date of Patent: Aug. 6, 2013

(54) SYSTEM AND METHOD FOR PROTECTING USER PRIVACY USING SOCIAL INFERENCE PROTECTION TECHNIQUES

(75) Inventors: Sara Gatmir Motahari, Kearny, NJ (US); Quentin Jones, New Brunswick, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 761 days.

(21) Appl. No.: 12/507,508

(22) Filed: Jul. 22, 2009

(65) Prior Publication Data

US 2010/0024042 A1 Jan. 28, 2010

Related U.S. Application Data

(60) Provisional application No. 61/082,551, filed on Jul. 22, 2008.

(51) Int. Cl.
*G06F 15/18* (2006.01)

(52) U.S. Cl.
USPC .................................................. 705/51; 706/3

(58) Field of Classification Search
USPC .................... 706/12; 707/999.102
See application file for complete search history.

(56) References Cited

U.S. PATENT DOCUMENTS

| 7,246,150 B1 | 7/2007 | Donoho et al. |
| 7,764,954 B2* | 7/2010 | Beyer, Jr. ...................... 455/416 |
| 8,099,380 B1* | 1/2012 | Shahabi et al. .................. 706/62 |
| 2002/0067832 A1 | 6/2002 | Jablon |
| 2002/0155844 A1* | 10/2002 | Rankin et al. .................. 455/456 |
| 2003/0050075 A1* | 3/2003 | Rangarajan et al. .......... 455/456 |
| 2004/0153664 A1* | 8/2004 | Rossler et al. ................ 713/200 |
| 2006/0004772 A1 | 1/2006 | Hagan et al. |
| 2007/0036353 A1 | 2/2007 | Reznik et al. |
| 2007/0156614 A1* | 7/2007 | Flinn et al. ...................... 706/12 |
| 2008/0182592 A1* | 7/2008 | Cha et al. .................... 455/456.3 |
| 2009/0287734 A1* | 11/2009 | Borders ........................ 707/102 |
| 2011/0035503 A1* | 2/2011 | Zaid et al. ..................... 709/228 |

OTHER PUBLICATIONS

Zheleva et al. "How friendship links and group memberships affect the privacy of individuals in social networks", Jul. 1, 2008.*
PCT International Search Report dated Sep. 17, 2009.
Parzen, Emanuel. On Estimation of a Probability Density Function and Mode. *The Annals of Mathematical Statistics*, 1962.
Denning, Dorothy E., Denning, Peter J., Schwartz, Mayer D. The Tracker: A Threat to Statistical Database Security. *ACM Transactions of Database Systems*, 1979.
Denning, D.E. and Morgenstern, M. Military database technology study: AI techniques for security and reliability SRI Technical report, 1986.
Morgenstern, Matthew. Security and Inference in Multilevel Databse and Knowledge-Base Systems. *ACM SIGMOD*, 1987.

(Continued)

*Primary Examiner* — Evens J Augustin
(74) *Attorney, Agent, or Firm* — McCarter & English, LLP

(57) ABSTRACT

A system and method for protecting user privacy using social inference protection techniques is provided. The system executes a plurality of software modules which model of background knowledge associated with one or more users of the mobile computing devices; estimate information entropy of a user attribute which could include identity, location, profile information, etc.; utilize the information entropy models to predict the social inference risk; and minimize privacy risks by taking a protective action after detecting a high risk.

14 Claims, 13 Drawing Sheets

(56) References Cited

OTHER PUBLICATIONS

Morgenstern, Matthew. Controlling Logical Inference in Multilevel Database Systems. 1988 IEEE Symposium, 1988.
Raudys, S.J., Jain, A.K. Small Sample Size Effects in Statistical Pattern Recognition: Recommendations for Practitioners and Open Problems. 1990 IEEE Symposium, 1990.
Stachour, Paul D., Thuraisingham, Bhavani. Design of LDV: A Multilevel Secure Relational Database Management System. 1990 IEEE Symposium, 1990.
Raudys, S., Skurikhina, M. The Role of the Number of Training Samples on Weight Initialisation of Articial Neural Net Classifier. 1992 IEEE Symposium, 1992.
Dourish, Paul. Culture and Control in a Media Space. ECSCW Proceedings, 1993.
Torra, et al., Trends in Aggregation and Security Assessment for Inference Control in Statistical Databases, International Journal of Uncertainty, Fuzziness and Knowledge-Based Systems, vol. 0, No. 0, pp. 1-5, 1993.
Schuler, Doug. Socal Computing. *Communications of the ACM*, 1994.
Cuppens, P. and Trouessin, G. Information Flow Controls vs Inference Controls: An Integrated Approach Third European Symposium on Research in Computer Security (ESORICS 94), 1994.
Hinke, T.H., Delugach, H.S., Wolf, R.P. Genie: A Databse Generator for Testing Inference Detection Tools. Technical Report TR-UAH-CS-1995-02, Computer Science Department, University of Alabama, 1995.
O'Leary, Daniel E. 'Some Privacy Issues in Knowledge Discovery: The OECD Personal Privacy Guidelines. *IEEE Expert*, 1995.
Denning, et al.., NCSC Technical Report—005. vol. 1, 1996, http://www.radium.ncsc.mil/tpep/library/rainbow/NCSC-TR-005-1.pdf.
Hudson, S.E. and Smith, I., Techniques for Addressing Fundamental Privacy and Disruption Tradeoffs in Awareness Support Systems. in ACM conference on Computer Supported Cooperative Work, CSCW, 1996.
Marks, Donald G. Inference in MLS Database Systems. *IEEE Transections on Knowledge and Data Engineering*, 1996.
Hale, John, Shenoi, Sujeet. Catalytic Inference Analysis: Detecting Inference Threats due to Knowledge Discovery. IEEE Symposium, 1997.
Hinke, T.H., Delugach H.S., Wolf, R.P. Protecting Databases from Inference Attacks. *Computers & Security*, 1997.
Lessig, Lawrence. The Architecture of Privacy. Taiwen Net Conference, 1998.
Dawson, S., De Capitani di Vimercati, S., Samarati, P. Specification and Enforcement of Classification and Inference Constraints. IEEE Symposium, 1999.
Ackerman, M. and Cranor, L., Privacy Critics: UI Components to Safeguard Users' Privacy. in *ACM Conference on Human Factors in Computing Systems (CHI99)*, (1999).
Ackerman, M.S., Cranor, L.P. and Reagle, J. Privacy in E-Commerce: Examining User Scenarios and Privacy Preferences *ACM Conference on Electronic Commerce*, 1999.
Brodsky, A, Farkas, C. and Jajodia, S. Secure databases: constraints, inference channels, and monitoring disclosures. *IEEE Transactions on Knowledge and Data Engineering*, 2000.
Clifton, Chris. Using Sample Size to Limit Exposure to Data Mining. *Journal of Computer Security*, 2000.
Ackerman, Mark S. The Intellectual Challenge of CSCW: The Gap Between Social Requirements and Technical Feasability. *Human-Computer Interaction*, 2000.
Ackerman, Mark S. Developing for Privacy: Civility Frameworks and Technical Design. ACM Conference for Computers, Freedom, and Privacy, 2000.
Ackerman, M., Darrell, T., Weitzner, D.J. Privacy in Context. *Human-Computer Interaction*, 2001.
Tavani, H.T., Moor, J.H. Privacy Protection, Control of Information, and Privacy-Enhancing Technologies. *Computers and Society*, 2001.

Ramakrishnan, N., Keller, B.J., Mirza, B.J., Grama, A.Y., Karypis, George. Privacy Risks in Recommender Systems. *Personalization and Privacy*, 2001.
Solana-Ortegam A., Solana V. Logical COnditioning and Entropy Inference Based on Observational Data. *Open Sys. & Information Dyn.*, 2001.
Duncan, George T., Fienberg, Stephen E., Krishnan, Ramayya, Padman, Rema, Roehrig, Stephen F. Disclosure Limitation Methods and Information Loss for Tabular Data. *Systems for Research*, 2001.
Biskup, Joachim, Bonatti, Piero. Controlled Query Evaluation for Known Policies by Combining Lying and Refusal. Annals of Mathematics and Artificial Intelligence, 2001.
Chiang, Y., Hsu, T., Kuo, S., Wang, D. Preserving Confidentiality When Sharing Medical Database the Cellsecu System. APAMI-MIC, 2001.
Jiang, X., Landay, J.A. Modeling Privacy Control in Context-Aware Systems. *Pervasive Computing*, 2002.
Canny, J., Collaborative Filtering with Privacy VIa Factor Analysis, in $25^{th}$ Aannual Iinternational ACM SIGIR Conference on Research and Development in Information Retrieval (2002), 238-245.
Osbakk, Patrik, Ryan, Nick. Context, CC/PP, and P3P. UbiComp 2002 Adjunct Proceedings, 2002.
Jendricke, Uwe, Kreutzer, Michael, Zugenmaier, Alf. Pervasive Privacy with Identity Management. UbiComp 2002 Adjunct Proceedings, 2002.
Cranor, L., Langheinrich, M., Marchiori, M. and Reagle, J. The Platform for Privacy Preferences 1.0 (P3P1.0) Specification *W3C recommendation*, 2002.
Terry, M., Mynatt, E.D., Ryall, K., Leigh, D. Social Net: Using Patterns of Physical Proximity Over Time to Infer Shared Interests. Proceedings of Human Factors in Computing Systems, 2002.
Chang, Liwu, Moskowitz, Ira S. A Study of Inference Problems in Distributed Databases. Naval Research Laboratory, 2002.
Diaz, C., Seys, S., Claessens, J., Preneel, B. Towards Measuring Anonymity. PET Proceedings, 2002.
Serjantov, Andrei, Danezis, George. Towards an Information Theoretic Metric for Anonymity. University of Cambridge Computer Laboratory, 2002.
Sweeney, Latanya. K-Anonymity: A Model for Protecting Privacy. *International Journal on Uncertainty, Fuzziness, and Knowledge-Based Systems*, 2002.
Erdogmus, Deniz, Principe, Jose C. An Error-Entropy Minimization Algorithm for Supervised Training of Nonlinear Adaptive Systems. IEEE Transactions on Signal Processing, 2002.
Sweeney, Achieving κ-Anoymity Privacy Protection Using Generalization and Suppression, International Journal on Uncertainty, Fuzziness and Knowledge-Based Systems, 10(5), pp. 571-588, 2002.
Beresford, AR. and Stajano, P. Location Privacy in Pervasive Computing. *IEEE Pervasive Computing*, 2003.
Hong, J., Boriello, G., Landay, J., McDonald, D., Schilit, B. and Tygar, J.D., Privacy and Security in the Location-enhanced World Wide Web. in *Workshop on privacy at Ubicomp*, (2003).
Oikarinen, Emilia. Revealing Information While Preserving Privacy. Helsinki University of Technology, 2003.
Griswold, W.G., Shanahan, P., Brown, S.W., Boyer, R.T. ActiveCampus—Experiments in Community-Oriented Ubiquitous Computing. IEEE Computer, 2003.
Hsu, T., Liau, C., Wang, D. Quantitative Models for Privacy Protection. Institute for Information Science, 2003.
Beckwith, Richard. Designing for Ubiquity: The Perception of Privacy. IEEE CS/IEEE ComSoc, 2003.
Palen, Leysia, Dourish, Paul. Unpacking "Privacy" For a Networked World. ACM, 2003.
Erdogmuse, D., Hild, K.E., Principe, J.C. Online Entropy Manipulation: Stochastic Information Gradient. IEEE Signal Processing Letters, 2003.
Kesdogan, Dogan, Pimenidis, Lexi. The Hitting Set Attack on Anonymity Protocols. Aachen University of Technology, 2004.
Toth, Gergely, Hornak, Zoltan, Vajda, Ferenc. Measuring Anonymity Revisited. Budapest University of Technology and Economics, 2004.
Eldin, A.A., Wagenaar, R. A Fuzzy Logic Approach to Privacy Control in Context Aware Services. Delft University of Technology, 2004.

Hong, J.1. and Landay, J.A, An Architecture for Privacy-Sensitive Ubiquitous Computing. In *2nd International Conference on Mobile systems, Applications, and Services, MobiSys* 2004 (2004), 177-189.

Biskup, Joachin, Bonatti, Piero. Controlled Query Evaluation for Enforcing Confidentiality in Complete Information Systems. Springer-Verlag, 2004.

Hore, Bijit, Mehrotra, Sharad, Tsudik, Gene. A Privacy-Preserving Index for Range Queries. Proceedings of the 30$^{th}$ VLDB Conference, 2004.

Ali Eldin, A., van den Berg, J., Wagenaar, R. A Fuzzy Reasoning Scheme For Context Sharing Decision Making. ACM, 2004.

Clifton, C., Doan, A., Elmagarmid, A., Kantarcioglu, M., Schadow, G., Suciu, D., Vaidya, J. Privacy-Preserving Data Integration and Sharing. ACM, 2004.

Boyens, C., Krishnan, R., Padman, R. On Privacy-Preserving Access to Distributed Heterogeneous Healthcare Information. IEEE, 2004.

Chen, X., Wei, R. A Dynamic Method for Handling the Interference Problem in Multilevel Secure Databases, ICITCC, 2005.

Thuraisingham, Bhavani. Privacy Constraint Processing in a Privacy-Enhanced Database Management System. *Data & Knowledge Engineering*, 2005.

Consolvo, S., Smith, I.E., Matthews, T., LaMarca, A, Tabert, J. and Powledge, P. Location Disclosure to Social Relations: Why, When, & What People Want to Share *ACM Conference on Human Factors in Computing Systems (CHI2005)*, 2005.

Hong, D., Yuan, M. and Shen, V.Y., Dynamic Privacy Management: a Plugin Service for the Middleware in Pervasive Computing. in *ACM 7th international conference on Human computer interaction with mobile devices & services*, 2005.

Sacramento, V., Endler, M., Nascimento, F.N. Design of a Context Privacy Service for Mobile Collaboration. Departamento de Informatica, PUC-Rio, 2005.

Tentori, M., Favela, J., Gonzalez, V.M., Rodriguez, M.D. Towards the Design of Privacy-Aware Computing: A Case Study in Hospital Work. CICESE, 2005.

Agarwal, G., Feder, T., Kenthapadi, K., Motwani, R., Panigrahy, R., Thomas, D., Zhu, An. Approximation Algorithms for κ-Anonymity. *Journal of Privacy Technology*, 2005.

Narayanan, A., Shmatikov, V. Obfuscated Databases and Group Privacy. ACM, 2005.

Eldin, AA and Wagenaar, R, A Privacy Preferences Architecture for Context Aware Applications. in *IEEE international conference on Computer Systems and Applications*, (2006), 1110-1113.

Tang, KP., Fogarty, J., Keyani, P. and Hong, J.I., Putting People in their Place: An Anonymous and Privacy Sensitive Approach to Collecting Sensed Data in Location-Based Applications. in *ACM Conference on Human Factors in Computing Systems*, 2006.

Jajodia, Sushil, Meadows, Catherine. Inference Problems in Multi-level Secure Databse Management Systems. *Information Security*, 2006.

Hengartner, Urs, Steenkiste, Peter. Avoiding Privacy Violations Caused by Context-Sensitive Services. University of Waterloo, 2006.

Cranor, L. F., Guduru, P., Arjula, M. User Interfaces for Privacy Agents. Carnegie Mellon University, 2006.

Dourish, Paul, Anderson, Ken. Collective Information Practice: Exploring Privacy and Security as Social and Cultural Phenomena. *Human-Computer Interaction*, 2006.

Bottcher, S., Steinmetz, R. Finding the Leak: A Privacy Audit for Sensitive XML Databases, ICDEW, 2006.

Kier, C., Aach, T. Predicting the Benefit of Sample Size Extension in Multiclass κ-NN Classification. ICPR, 2006.

Bentley, Frank, Metcalf, Crysta. Sharing Motion Information With Close Family and Friends. CHI 2007 Proceedings, 2007.

Lodha, Sachin, Thomas, Dilys. Probabilistic Anonymity. Tata Consultancy Services, 2007.

Machanavajjhala, A., Gehrke, J., Kifer, D. I-Diversity: Privacy Beyond κ-Anonymity. Cornell University, 2007.

Zhan, Justin, Matwin, Stan. Privacy-Preserving Data Mining in Electronic Surveys, *International Journal of Network Security*, 2007.

Singh, Lisa, Zhan, Justin. Measuring Topological Anonymity in Social Networks. IEEE, 2007.

Chew, Monica, Balfanz, Dirk, Laurie, Ben. (Under)mining Privacy in Social Networks. Google Inc., 2008.

Carvalho, Luis E., Lawrence, Charles E. Centroid Estimation in Discrete High-Dimensional Spaces with Applications in Biology. PNAS, 2008.

Bentley, Frank, Metcalf, Crysta. Location and Activity Sharing in Everyday Mobile Communication. CHI Proceedings, 2008.

Narayanan, A., Shmatikov, V. De-anonymizing Social Networks. The Univertiy of Texas at Austin, 2009.

Motahari, S., Ziavras, S., Schuler, R. and Jones, Q. Identity Inference as a Privacy Risk in Computer-Mediated *Hawaii International Conference on System Sciences*, 2009.

Mynatt, et al, Making Ubiquitous Computing Visible, College of Computing Graphics, Visualization and Usability Center, Georgie Institute of Technology, 2 pages, no date.

* cited by examiner

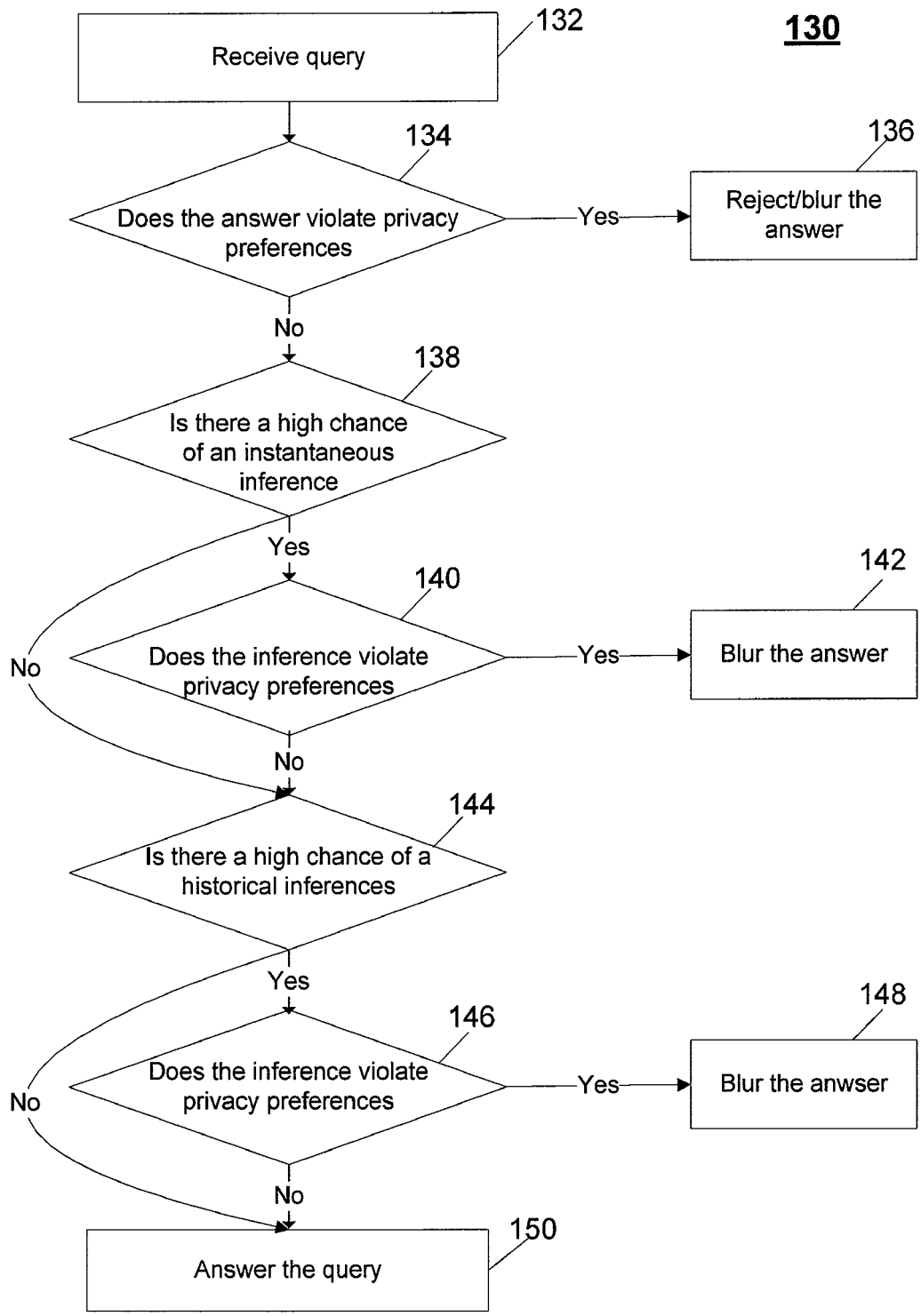

SYSTEM AND METHOD FOR PROTECTING USER PRIVACY USING SOCIAL INFERENCE PROTECTION TECHNIQUES

RELATED APPLICATIONS

This application claims the priority of U.S. Provisional Application Ser. No. 61/082,551 filed Jul. 22, 2008, the entire disclosure of which is expressly incorporated by reference.

GOVERNMENT RIGHTS

This invention was made with support from the U.S. Government under National Science Foundation Grant Numbers IIS-0749389, CNS-0454081, IIS-0534520 and IIS-0308018. The Government has certain rights in this invention.

BACKGROUND OF THE INVENTION

1. Field of the Invention

The present invention relates to the protection of the privacy of individuals communicating through computing or telecommunication devices/systems, or interacting software applications. More specifically, the present invention relates to a system and method for protecting user privacy using social inference protection techniques.

2. Related Art

Social computing relates to any type of computing application in which software serves as an intermediary of social relations. Examples of social computing applications include email, instant messaging, social networking web sites, and photo sharing web sites. Mobile social computing relates to social applications that run on mobile devices. A wide variety of mobile social computing applications exist, many of which leverage location and mobility to provide innovative services. Examples of such applications include the Ulocate system, which allow for user real-time tracking of users and provides a list people within a social network, as well as their locations; the LoveGety system, which provides proximity match alerts when a male LoveGety user and a female LoveGety user are within 15 feet of one another; the ActiveCampus system, which provides maps showing the location of users on campus; the Social Net system, which provides social match alerts inferred from collocation histories; various matching systems which recommend people to people based on similar interests, activities, personalities, etc.; and Twitter, which enables microblogging/citizen journalism.

Many social networking sites such as Facebook and Orkut use user profiles and existing friendships to enable social communications or recommend possible matches. However, using and sharing geotemporal and personal information raises many serious privacy concerns. Examples of categories of potential privacy invasions in mobile social computing systems are: inappropriate use by administrators (for example, a system administrator may sell personal data without permission); legal obligations (for example, a system administrator may be forced by an organization such as the police to reveal personal data); inadequate security; lack of control over direct revelations (for example, a cell phone application that reveals one location to a person's friends, but does this without properly informing the person or giving the person control of this feature); instantaneous social inference through lack of entropy: (for example, when one cell phone shows that Bob is nearby, and only two people with a similar cell phone are visible—one of them must be Bob, thus increasing the chance of identifying him; the example of the student and professor mentioned in the introduction also illustrates this category); historical social inferences through persistent user observation (for example, two nicknames are repeatedly shown on the first floor of the gym where the gym assistant normally sits—one of them must be the gym assistant); and social leveraging of privileged data (for example, David can't access a location, but Jane can—David asks Jane for the location).

The problem of social inferences which include instantaneous social inferences and historical social inferences is of particular concern in social computing. Inference is the process of concluding unrevealed information as a consequence of being presented with authorized information. A well-known example of the inference problem relates to an organization's database of employees, where the relation <Name, Salary> is a secret, but user u requests the following two queries: "List the RANK and SALARY of all employees" and "List the NAME and RANK of all employees." None of the queries violates the security requirement because they do not contain the top-secret <NAME; SALARY> pair. But clearly, the user can infer the salaries of the employees using their ranks. Although the inference problem as a threat to database confidentiality is discussed in many studies, mobile social computing raises new classes of more complicated inferences, which we call social inferences. Social inferences are inferences about user information such as identity, location, activities, social relations, and profile information.

The social inference problem can include a wide range of issues. However, any inference that results from using social applications can be made in one of the following two ways:

1) the inferrer uses only the current state of the system, which is based only on the current observation of the system (referred to as "instantaneous inference"); or
2) the inferrer uses the history of her/his observations, or the history of the answers to previous queries (referred to as historical inference).

Based on the nature of mobile social applications, social inferences are either the result of accessing location-based information or the result of social communications, or both. The first type is referred to herein as "location-related inferences" and the second type is referred to herein as "inferences in online communications." The following examples are illustrative:

1. Instantaneous social inferences in online communications: Cathy chooses a nick name for her profile and hides her real name, but her profile shows that she is a female football player. Since there are only a few female football players at a given school, there is a high chance she can be identified.
2. Instantaneous location-related social inferences: a cell phone shows few nicknames in a room, and it is known that the room is Professor Smith's office. Therefore, Professor Smith is in his office and one of those few nicknames belongs to him.
3. Historical location-related inferences: Superman2 and Professor Johnson are repeatedly shown in a room, which is known as Professor Johnson's office. It is also known that David is his Ph.D. student. Therefore, Superman2 must be David and he is currently at Professor Johnson's office.

Instantaneous and historical inferences must be predicted differently. However, previous inference prevention methods have not adequately addressed social inferences. This is due, in large part to the facts that:

1. The sensitivity of user information is dynamic in nature based on the context, such as time and location;
2. Information available to users is not limited to answers obtained from their queries, but includes users' background knowledge (the information users learn outside the database), which often is a premise in many inferences;

3. Information such as life patterns, physical characteristics, and the quality of social relations that are not kept in the database can be inferred from information available to the user (therefore, inferences in such systems are not limited to database attribute disclosures); and 4. Most social inferences are partial inferences not absolute inferences, i.e. they don't logically result from the premises as in the name-rank-salary example, but they can be guessed as a result of low information entropy.

Extensive research and industry efforts have focused on helping computer users protect their privacy. Researchers have looked at various aspects of privacy enhancement such as ethics of information management, system features, access control systems, security and database confidentiality protection. These efforts can be classified into four sections, as discussed below: (1) ethics, principles and rules; (2) direct access control systems; (3) security protection; and (4) inference control solutions.

(1) Ethics, Principles, and Rules

In order to properly respond to concerns of ethics, principles and rules, and to protect the user privacy, researchers have made various suggestions. In particular, they have mentioned the following provisions for privacy sensitive systems:

Provide users with simple and appropriate control and feedback especially on the ways others can interact with them or access their information;

Provide appropriate user confirmation feedback mechanisms;

Maintain comfortable personal spaces to protect personal data from surreptitious capture;

Provide a decentralized architecture;

Provide the possibility of intentional ambiguity and plausible deniability;

Assure limited retention of data or disclose the data retention policy;

Facilitate the users with enough knowledge of privacy policies; and

Give users access to their own stored information.

However, the foregoing provisions do not ensure that data will not be used in any undesired way, or that unnecessary data will not be collected. Therefore, one effort defines the principles of fair information practices as openness and transparency, individual participation, collection limitation, data quality, use limitation, reasonable security, accountability, and explicit consent. Then, principles for privacy in mobile computing are set, which consist of notice, choice, proximity, anonymity, security, and access. The aforementioned concerns and suggested requirements all relate to the aforementioned categories of inappropriate use, legal obligations, inadequate security, and poor features.

(2) Direct Access Control Systems

Access control systems provide the user with an interface and directly control people's access to the user or his/her information based on his/her privacy settings. Access control systems with an interface to protect user privacy started with internetworking. Later, they were extended to context-aware and then ubiquitous computing. The earliest work with in this area is P3P. P3P enables users to regulate their settings based on different factors including consequence, data-type, retention, purpose, and recipient. Another access control system, critic-based agents for online interactions, watch the user's actions and make appropriate privacy suggestions. Access control mechanisms for mobile and location-aware computing were introduced later.

In mobile systems, the context is also used as a factor in decision making. Thus, in addition to the factors defined in P3P, such as the recipient, the following aspects of context have been considered:

Location of the data owner;
Location of the data recipient;
Observational accuracy of data/granularity;
Persistence of data; and
Time.

One system, Confab for mobile computing environments, enables users to set what information is accessible by others on their contact list based on the time of information collection. Similar systems in mobile environments adds the time of information collection to the factors of recipient and datatype. Also, a privacy awareness system targeted at mobile computing environments has bee implemented, and is designed to create a sense of accountability for users. It allows data collectors to announce and implement data usage policies, and provides data subjects with technical means to keep track of their personal information. Another approach involves a peer-to-peer protocol for collaborative filtering in recommendation systems, which protects the privacy of individual data.

More recently, the use of location data has raised important privacy concerns. In context-aware computing, the Place Lab system has been proposed for a location-enhanced World Wide Web. It assumes a location infrastructure that gives users control over the degree of personal information they release. Another approach relates to the idea of hitchhiking for location-based applications that use location data collected from multiple people to infer such information as whether there is a traffic jam on a bridge. It treats the location as the primary entity of interest. Yet another solution extended the P3P to handle context-aware applications and defined a specification for representing user privacy preferences for location and time. In a conceptually similar work, another approach examined a simple classification and clearance scheme for privacy protection. Each context element of any user is assigned a classification level indicating its sensitivity and accessing users are each assigned clearance values representing levels of trust for the various elements that can be accessed. For better robustness, this approach made a list of access control schemes for specific elements, thus allowing a combination of permissions for read, write and history accesses.

An identity management system for online interactions in a pervasive environment encompassing PDAs has also been propsed. It enables the users to control what pieces of their personal information to reveal in various pre-defined situations such as interacting with a vending machine, doing bank activities, or getting a bus time table. Not only does the sensitivity of information depend on the context in a mobile system, but the context itself can also be part of the information that requires protection. There have been few attempts to implement systems that do both. One solution suggested a system in which users can define different situations and different faces for themselves, and they can decide who sees what face in which situation. Another solution involves a simulation tool to evaluate architectures parameterized by users' privacy preferences for context aware systems. Users can set their preferences to protect various types of personal information in various situations. Still other approaches focused on location privacy in pervasive environments, wherein the privacy-protecting framework is based on frequently changing pseudonyms to prevent user identification.

Finally, one solution suggested the idea of Virtual Walls which allow users to control the privacy of their digital information.

Access control systems mostly deal with a lack of control over direct revelations. Since they only help users control direct access to their information and don't prevent inferences, they don't fully protect user privacy.

(3) Security Protection

Security protection handles the following aspects:

Availability (services are available to authorized users);

Integrity (free from unauthorized manipulation);

Confidentiality (only the intended user receives the information);

Accountability (actions of an entity must be traced uniquely); and

Assurance (assure that the security measures have been properly implemented).

Therefore, security research has explored detection and prevention of many attacks including Reconnaissance, Denial-of-Service, Privilege Escalation, Data Intercept/Alternation, System Use Attacks, and Hijacking. Confidentiality protection is the area that contains most of the previous research on the inference problem. The inference problem is mostly known as a security problem that targets system-based confidentiality. Therefore, suggested solutions often deal with secure database design. There are also methods that evaluate the queries to predict any inference risks.

(4) Inference Control Solutions

Inference is commonly known as a threat to database confidentiality. Two kinds of techniques have been proposed to identify and remove inference channels. One technique is to use semantic data modeling methods to locate inference channels in the database design, and then to redesign the database in order to remove these channels. Another technique is to evaluate database queries to understand whether they lead to illegal inferences. Each technique has its own drawbacks. The former has the problem of false positives and negatives, and vulnerability to denial of service attacks. The latter can cause too much computational overhead. Besides, in a mobile social computing application they both can limit the usability of the system, because they can restrictively limit user access to information. Both techniques have been studied for statistical databases, multilevel secure databases, and general purpose databases. A few researchers have addressed this problem via data mining. Since in mobile social computing, user information and preferences are dynamic, queries need to be evaluated dynamically and the first method cannot be used in such systems.

With the development of the World Wide Web, new privacy concerns have surfaced. Most of the current work in access control for web documents relates to developing languages and techniques for XML documents. While these works are useful, additional considerations addressing the problem of indirect accesses via inference channels are required.

Classical information theory has been employed to measure the inference chance. Given two data items x and y, let $H(y)$ denote the entropy of y and $H_x(y)$ denote the entropy of y given x, where entropy is as defined in information theory. Then, the reduction in uncertainty of y given x is defined as follows:

$$\mathit{Infer}(x \rightarrow y) = \frac{H(y) - H_x(y)}{H(y)}$$

The value of Infer $(x \rightarrow y)$ is between 0 and 1, representing how likely it is to derive y given x. If the value is 1, then y can be definitely inferred given x. However, there are serious drawbacks to using this technique:

1. It is difficult, if not impossible, to determine the value of $H_x(y)$; and
2. The computational complexity that is required to draw the inference is ignored—nevertheless, this formulation has the advantage of presenting the probabilistic nature of inference (i.e. inference is a relative not an absolute concept).

Additional research has focused on techniques for anonymization. Anonymity is defined as not having identifying characteristics such as a name or description of physical appearance disclosed so that the participants remain unidentifiable to anyone outside the permitted people promised at the time of informed consent. Recently, new measures of privacy called k-anonymity and L-diversity have gained popularity. K-anonymity is suggested to manage identity inference, while L-diversity is suggested to protect both identity inference and attribute inference in databases. In a k-anonymized dataset, each record is indistinguishable from at least k−1 other records with respect to certain "identifying" attributes. These techniques can be broadly classified into generalization techniques, generalization with tuple suppression techniques, and data swapping and randomization techniques. Nevertheless, k-anonymized datasets are vulnerable to many inference attacks and collection of knowledge outside of the database and L-diversity is very limited in its assumptions about background knowledge.

Identity inferences in mobile social computing cannot be addressed by the above techniques because:

The sensitivity of user information is dynamic in nature based on the context, such as time and location;

Information such as life patterns, physical characteristics, and the quality of social relations that are not kept in the database can be inferred from information available to the user—therefore, inferences in such systems are not limited to attribute disclosures; and Users' background knowledge (the information users learn outside the database) is a premise in many inferences.

The present invention addresses the foregoing shortcomings by providing a system and method for protecting user privacy using social inference protection techniques.

SUMMARY OF THE INVENTION

The present invention relates to a system and method for protecting user privacy using social inference protection techniques. The present invention could be implemented as a software application executing on a server or a networked computing device (e.g., a mobile computing device forming part of one or more computer networks). The software application includes a plurality of modules which execute the following steps: (1) modeling of the inferrer's background knowledge (which typically includes the social context); (2) keeping a record of information revealed in the past such as the answer to previous queries; (3) estimating information entropy of a user attribute which could include identity, location, profile information, etc; (4) utilizing the information entropy models to predict the social inference risk; and (5) minimizing privacy risks by taking a proper action after detecting a high risk. Actions taken by the system to minimize privacy risks include, but are not limited to, informing users about current privacy risks through visualizations, providing users with a history of what they have revealed, reminding users of current privacy policies, enacting privacy policies that would prevent the unwanted exchange of information, etc.

BRIEF DESCRIPTION OF THE DRAWINGS

The foregoing features of the invention will be apparent from the following Detailed Description of the Invention, taken in connection with the accompanying drawings, in which:

FIG. 6 is a flowchart showing processing steps according to the present invention for protecting user privacy during handing of queries for information issued by users;

DETAILED DESCRIPTION OF THE INVENTION

The present invention relates to social inference protection systems and methods, as discussed in detail below with reference to FIGS. 1-11.

Figure 1A:
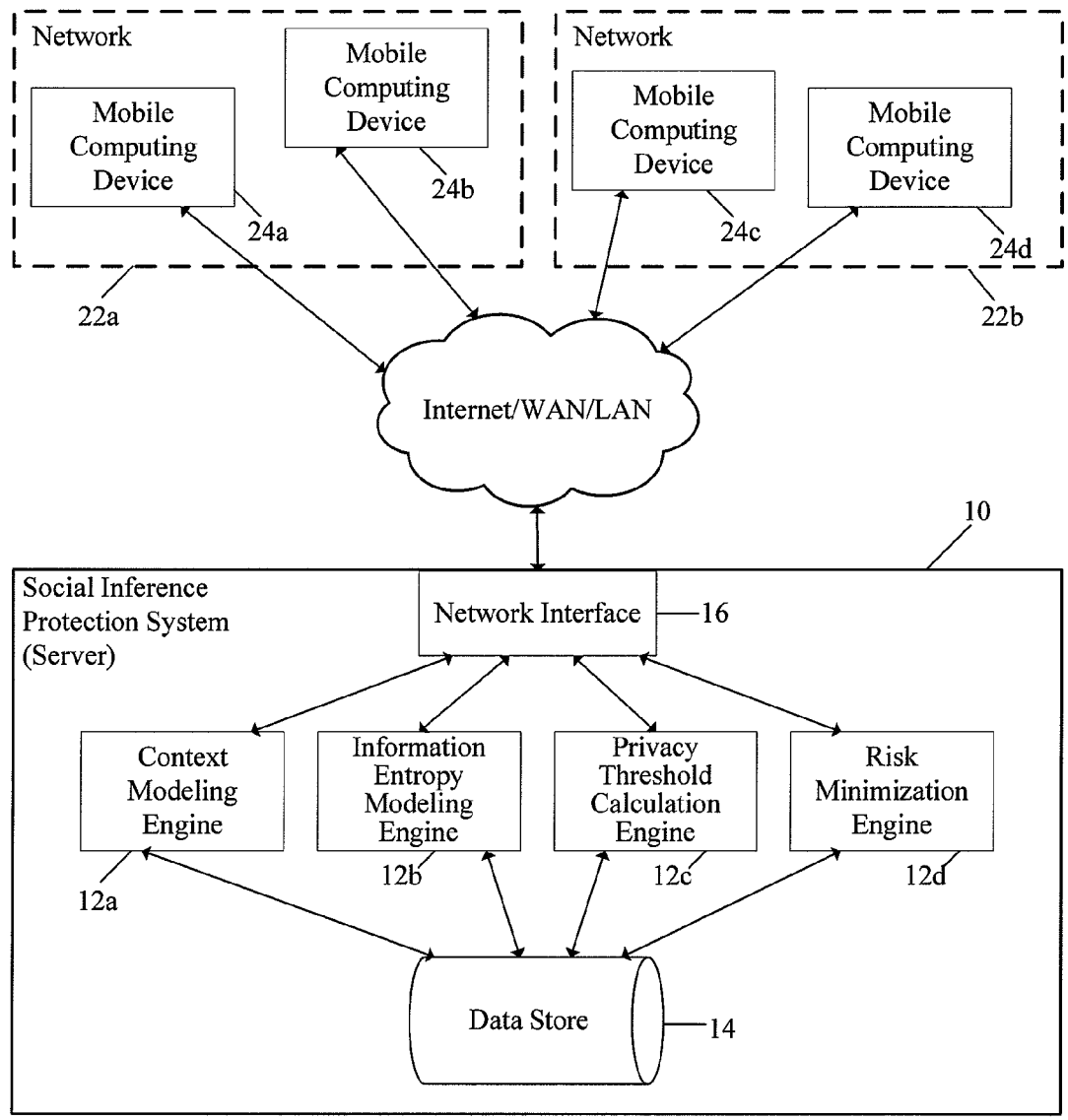
FIG. 1A is a diagram showing hardware and software components of the present invention, implemented in a client/server environment.

FIG. 1A is a diagram showing hardware and software components of the social inference protection system of the present invention, indicated generally at 10, implemented in a client/server environment. As will be discussed in greater detail below, the present invention could be implemented on a server forming part of a client/server environment, or as a standalone software application executing on a computing device forming part of a network.

As shown, the system 10 could be implemented on a computer system (server) in communication with a network 20 (which could include the Internet, a local area network (LAN), wide area network (WAN), metropolitan area network (MAN), etc.), and could include a plurality of software modules 12a-12d executed by the system 10, a central data store 14 accessible by the software modules 12a-12d, and a network interface 16 for allowing the software modules to communicate with a plurality of computing devices 24a-24d via the network 20, which computing devices could be mobile (such as cellular telephones, portable/laptop computers, PDAs, etc.) or fixed. The computing devices 24a-24d could be part of networks 22a-22b, as shown in FIG. 1. The networks 22a-22b could support one or more social networks and/or social networking websites. It is noted that the computing devices 24a-24d need not be mobile, and indeed, could be any computer systems forming part of the networks 22a-22b. The software modules 12a-12d include a context modeling engine 12a, an information entropy modeling engine 12b, a privacy threshold calculation engine 12c, and a risk minimization engine 12d.

As will be discussed in greater detail below, the modules 12a-12d protect against inferences being made with respect to users of the computing devices 24a-24d, so as to protect the privacy of such users. The system 10 could be any suitable computer hardware platform (e.g., a single or multi-processor server having INTEL or other suitable microprocessors), running any suitable operating system (e.g., UNIX, LINUX, SOLARIS, WINDOWS SERVER, MACOS, etc.), without departing from the spirit or scope of the present invention. The network interface 16 could include a firewall for restricting access to the system 10, as well as associated data communications hardware. The data store 14 could include any suitable database management system, such as MYSQL, etc. Further, the software modules 12a-12d could be programmed using any suitable, high-level computing language, such as C, C++, C#, Java, etc.

Figure 1B:
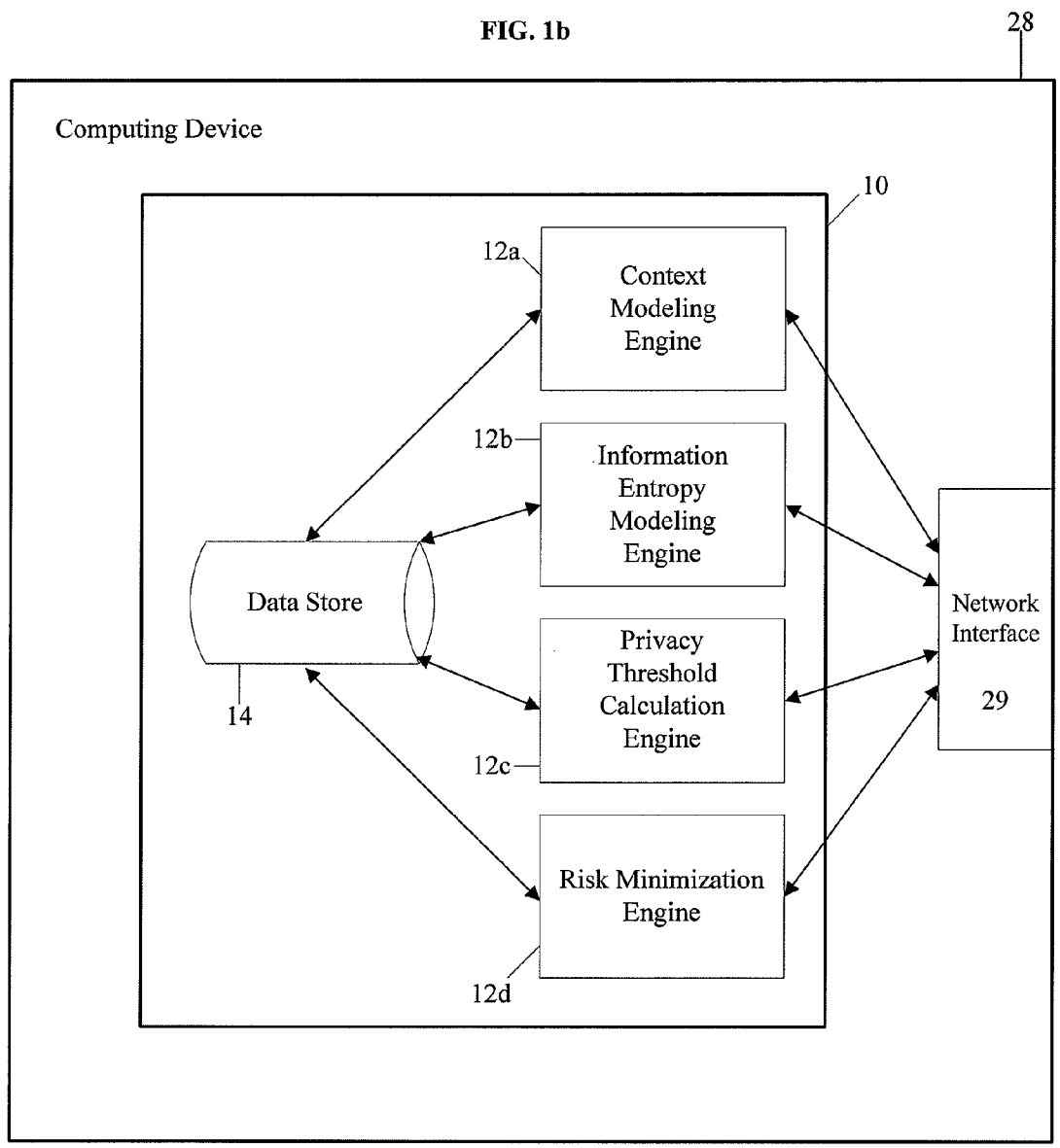
FIG. 1B is a diagram showing the present invention implemented as a software application executing on a computing device.

As shown in FIG. 1B, the system 10 could also be implemented as a standalone software application which executes on a computing device 28, which could be mobile or fixed and which is connected to a network (e.g., a LAN, MAN, WAN, the Internet, etc.) via a network interface 29 (which could be wired or wireless). In such circumstances, the system 10 includes the software modules 12a-12d, and the data store 14, which perform the functions discussed herein. The system 10 could be programmed using any suitable, high-level computing language.

The system 10 gathers and process information about users of the computing devices 24a-24d, and prevents instantaneous social inferences and historical social inferences. Based on information theory, as more information is collected about a user, such as his/her contextual situation, uncertainty about other aspects, such as his/her identity, may be reduced, thereby increasing the probability of correctly guessing these aspects. This probability also depends on the number of entities (e.g., users) that match the collected information. Collected information is not just the information that the present invention provides to users, but also includes the information collected outside of the data store 14 or background knowledge. Furthermore, inferred information may be external (outside of the data store 14). Examples include partial identity (e.g., identity at the physical appearance granularity), external profile information, and external social relations. Therefore, social inferences happen when information provided by the system 10 combined by the inferrer's background knowledge reduces the inferrer's uncertainty about a database attribute or an external attribute to a level that he/she could guess that attribute.

Inference control can be defined by $\neg (PK_A(Q) \wedge FK_A(Q))$, where $PK_A(Q)$ means A is permitted to know Q and $FK_A(Q)$ means A is forbidden to know Q. For a predefined access control table, the following definition is set forth:

$$R(A) = \{s \in \Lambda | l(s) \leq L(A)\}$$

$$F(A) = \{s \in \Lambda | \neg (l(s) \leq L(A))\}$$

where $\Lambda$ is the set of sentences, R(A) is the set of sentences for which A is explicitly permitted to have access, F(A) is the set of sentences for which A is explicitly forbidden to have an access, L(A) is the access level of user A, and l(s) is the classification level of sentence s. This definition means that forbidden data are not the data that are specifically forbidden, but the data that are not specifically permitted. R(A) and F(A)

cannot be defined for a mobile social computing environment where privacy settings may be highly dynamic. However, the following indication can be used:

$$[PK_A(Q) \wedge PK_A(Q \Rightarrow \Phi)] \Rightarrow PK_A(\Phi)$$

Consequently, if we want $\Phi$ to be forbidden for A and $\Phi$ can be inferred from Q, Q should be forbidden for A as well. To understand what determines $Q \Rightarrow \Phi$, we remind that considering partial inferences in a mobile social computing system, $\Phi$ may not be logically deduced from Q as indicated by $Q \Rightarrow \Phi$, but, $\Phi$ may belong to the Sphere Of Influence of Q (SOI(Q)). Accordingly, we modify Cuppons' formulation as follows: We define Q to be the information included in the query, its answer, and background knowledge that is modeled as described below. Q is safe to be completely known by A if $\forall \Phi, [\Phi \in SOI(Q) \wedge PK_A(Q)] \Rightarrow PK_A(\Phi)]$. In a social computing system, $\Phi \in SOI(Q)$ if knowing Q reduces the uncertainty about $\Phi$ and results in lack of information theory.

Based upon the foregoing, the modules 12a-12d of FIGS. 1A-1B perform the following steps:

I. Model background knowledge for related user social context (e.g., for introduction between strangers) which could be deterministic or probabilistic, using context modeling engine 12a. The background information could also be monitored by a system operator other individual, and the monitored information could be stored in a database, i.e., the context modeling engine 12a is optional.

II. Calculate the information entropy of user context (and related inference function) for instantaneous inferences using information entropy modeling engine 12b, taking background knowledge into account.

III. Calculate the information entropy associated with user context for historical inferences using information entropy modeling engine 12b, taking the answer to the past queries and background knowledge into account.

IV. Calculate the privacy thresholds using the privacy threshold calculation engine 12c, based on the user settings, administration privacy policies, community set privacy policies, or social and legal norms.

V. Find out if current or likely future entropy level passes the threshold or violates any of the above policies using the privacy threshold calculation engine 12c.

VI. Protect users' privacy by taking suitable risk-minimizing actions using the risk minimization engine 12d.

The functions performed by each of the software modules 12a-12d are discussed below in greater detail.

Context Modeling Engine 12a

Most previous inference control frameworks are vulnerable to attacks based on background knowledge. Background knowledge is the information available to users outside the database. This information should be assumed to be known by all the users just like answers to their queries are assumed to be known by them. In order to preserve database integrity, it is necessary to model user knowledge in the outside world.

Background knowledge can be deterministic or probabilistic. Deterministic knowledge is the information that user has gain or can easily access by accessing available sources while probabilistic knowledge is just a guess. For example, the fact that a specific room on campus is Professor Smith's room is a deterministic knowledge because it is mentioned on the school's website while guessing someone's gender only based on their chat style is a probabilistic knowledge.

To satisfy the inference control conditions in this domain, the context modeling engine 12a models easy-to-learn information about location as part of A's background knowledge in addition to the information that the system gives out to him.

In proximity-based applications, background knowledge includes visual information about nearby people and knowledge of their names. Examples of such background knowledge are as follows:

Users' background knowledge about their vicinity:
Physical appearance of nearby people.
Names and profile information of nearby people who the inferrer knows.
Nearby people who are users of the social application (carry the needed device)
Users' background knowledge about rooms and places:
Purpose and schedule of the place
People related to the schedule
Owner or manager of the place
People related to the manager To learn about background knowledge in computer-mediated communications, studies can be run between people communicating on-line. Modeled information can include profiles, campus directory (in the case of a campus environment), and guesses based on gender and chat style as background knowledge. Background knowledge in this context can be categorized as follows:

General demographics and personal information such as personal profiles
Related organizations' public information about people (such as the school's directory, school's website, phone directories, and yellow pages)
Guess on gender
Guess on ethnicity We assure background knowledge is included in the model Q. Hence, Q includes the information in the query, its answer as well as the modeled information. Now, we can estimate SOI(Q) having all the information modeled in Q. All the information included in Q and its higher granularifies need to be checked. This modeled information is then stored by the context modeling engine 12a in the data store 14. It is noted that the engine 12a is optional, and that background information could be acquired through monitoring by a system operator or other individual, and then entered into the data store 14 by such individual.

Information Entropy Modeling Engine 12b

Engine 12b calculates the risk that an attribute $\Phi$ is inferred from revealed information, Q. We define the inference function as follows:

$$INF1(Q \to \Phi) = \frac{H_{max} - H_c}{H_{max}}, \quad (1)$$

where $H_{max}$ represents the maximum entropy for the environment and is fixed for any given application; $H_c$ is the entropy under the current conditions and is dynamic based on the situation. $H_{max}$ is calculated as follows:

$$H_{max} = -\sum_1^X P \cdot \log_2 P \quad (2)$$

where P=1/X and X is the maximum number of entities (users) related to the application. $H_c$ is calculated as follows:

$$H_c = -\sum_1^V P1 \cdot \log_2 P1 \quad (3)$$

where V is the number of entities whose attribute $\Phi$ falls in SOI(Q). P1 is the probability that each of them is thought to be the correct attribute by the inferrer. For example, if the inferrer can see someone's available profile information, then:

Q: (profile information=given profile information & profile identity at nickname granularity or anonymous).
Φ: identity at real-name granularity.
X: the total number of potential profile users.
V: number of users, who have the same information in their profile.

One of the advantages of this formulation is that we can set the value of $H_{max}$ in each application in such a way that any given value of INF1 means the same inference chance independent of the application. When INF1 is too high, say larger than C, an appropriate action is taken by the risk minimization engine 12d. The appropriate action can be rejecting the query, blurring the answer, or sending a warning to the owner of the information.

When it comes to anonymity protection, the entropy control model also satisfies k-anonymity under any given condition for any given inferrer. In a k-anonymized dataset, each record is indistinguishable from at least k−1 other records with respect to certain "identifying" attributes. In our model, the above entities and attributes will be users and identities respectively. If we assume that all the information available to the users is deterministic (which means if they are able to access the information source, they are either able to know the exact answer or not) and assume that all information available outside the database is included in Q, then P1 in equation (3) equals 1/V and Hc equals $\Sigma(1/V) \cdot \log(1/V)$. Therefore, for any given application and known condition, INF1 is only determined by the number of users satisfying that condition; i.e., to have an INF1 value smaller than the associated threshold, at least U indistinguishable users are needed in the situation. This satisfies k-anonymity with k=U. However, the present entropy control method is more general than the k-anonymity solution. In particular, it can model a probabilistic model of background knowledge, such as guesses on gender and home country. It can also be used to calculate the risk of inferring other attributes such as location. The following examples illustrate how it is applied to identity protection.

A. Location-Related Identity Inference.

Background knowledge includes visual information about the inferrer's vicinity. For example, if the inferrer knows that he or she has got a nearby match in a matching system, then:

Q: (time=current time & location=vicinity of the inferrer & physical characteristics match possible physical characteristics of the inferrer's matching interests & nearby people and events).
$\Phi_1$: nearby people's identity at physical appearance granularity.
X total number of potential users of the application.
V: number of users that satisfy Q, i.e. they are currently in the inferrer's vicinity and match the possible physical characteristics.

If the resulting INF1 value is close to 1, there is a high inference risk and we need to take an action to prevent it. For example, we can use a blurring method and instead of showing the location at room precision, we could just show it at floor or building precision, or we can send a warning to the information owner about the high inference risk.

B. Identity Inference in Computer-mediated Communication

We also explained background knowledge associated with on-line communications. As an example of a possible inference, Catherine is matched with an anonymous person. During the introduction course of matching, her match selects two profile items to be revealed: (1) he is Hispanic; and (2) he is a member of the basketball team. Catherine does a search on the profiles and she finds only one Hispanic basketball player. Therefore, she can find his name and all his public profile information.

In an anonymous communication, assuming that communication partners A and B are not nearby, the probability that B infers A's identity based on equation (1) is modeled as follows:

Q: (profile items matching A's profile items that are already revealed).
Φ: Partner's identity.
X: total number of potential users of the application.
V: number of users that satisfy Q.

We define:
Group F: users that are the same sex as A and satisfy Q.
Group G: users in the inferrer's vicinity that come from the same country/region as A and satisfy Q.
X1: number of users in group F.
X2: number of users in group G.
X3: number of users in the intersection of F and G (F∩G).
ς: probability of guessing the right gender from the partner's chat style (which was shown to be 10.8% in our user study).
σ: probability of guessing the right home country from the partner's chat style (which was shown to be 5.4% in our user study).

If online typing is enabled:

$$P1 = \begin{cases} \varsigma \cdot \sigma / X3 + \varsigma \cdot (1-\sigma) / & \text{for } F \cap G \\ (X1) + (1-\varsigma) \cdot \sigma/(X2) & \\ \varsigma \cdot (1-\sigma)/(X1) + & \text{for } F\text{-}F \cap G \\ (1-\varsigma) \cdot (1-\sigma)/V & \\ (1-\varsigma) \cdot \sigma/(X2) + & \text{for } G\text{-}F \cap G \\ (1-\varsigma) \cdot (1-\sigma)/V & \\ (1-\varsigma) \cdot (1-\sigma)/V & \text{for the rest of nearby users} \end{cases} \quad (5)$$

If their communication is carried out only through revealing profile items and no typing (and therefore no guesses based on the chat style) is involved:

$$P1 = 1/V, \quad (6)$$

which simplifies into a k-anonymity solution and if the number of users in a specific situation is less than a specific number, say U, there is a high chance of inference.

The information entropy modeling engine 12b also calculates information entropy for historical inferences, as discussed below. Both the modeled current and historical information entropies are stored in the data store 14.

Our model in the previous category applies here as well, but in this category Φ∈SOI(Q) if Q along with answers to past queries led to a lack of uncertainty that reveals Φ. The inference chance will be calculated from an inference formula similar to (1), as described below.

$$INF_i 2(Q \to \Phi) = \begin{cases} \dfrac{H_{max} - H_i}{H_{max}}, & \text{if } \dfrac{H_{max} - H_i}{H_{max}} < C \\ \lambda, & \text{if } \dfrac{H_{max} - H_i}{H_{max}} \geq C \end{cases} \quad (12)$$

where $$H_{max} = -\sum_1^Y P \cdot \log_2 P.$$

($H_{max}$ is again fixed for each application.)
λ=number of queries that involve the attribute and were sent after ($H_{max}-H_i/H_{max}$ reached the threshold value C.

$$H_i = -\sum_1^V P1 \cdot \log P1. \quad (13)$$

where P1 is the probability that each of them is thought to be the correct attribute by the inferrer. V is the number of users that belong to SOI(Q) where Q also includes previous queries starting at the current time and going back an amount of time equal to T (given).

Figure 2:
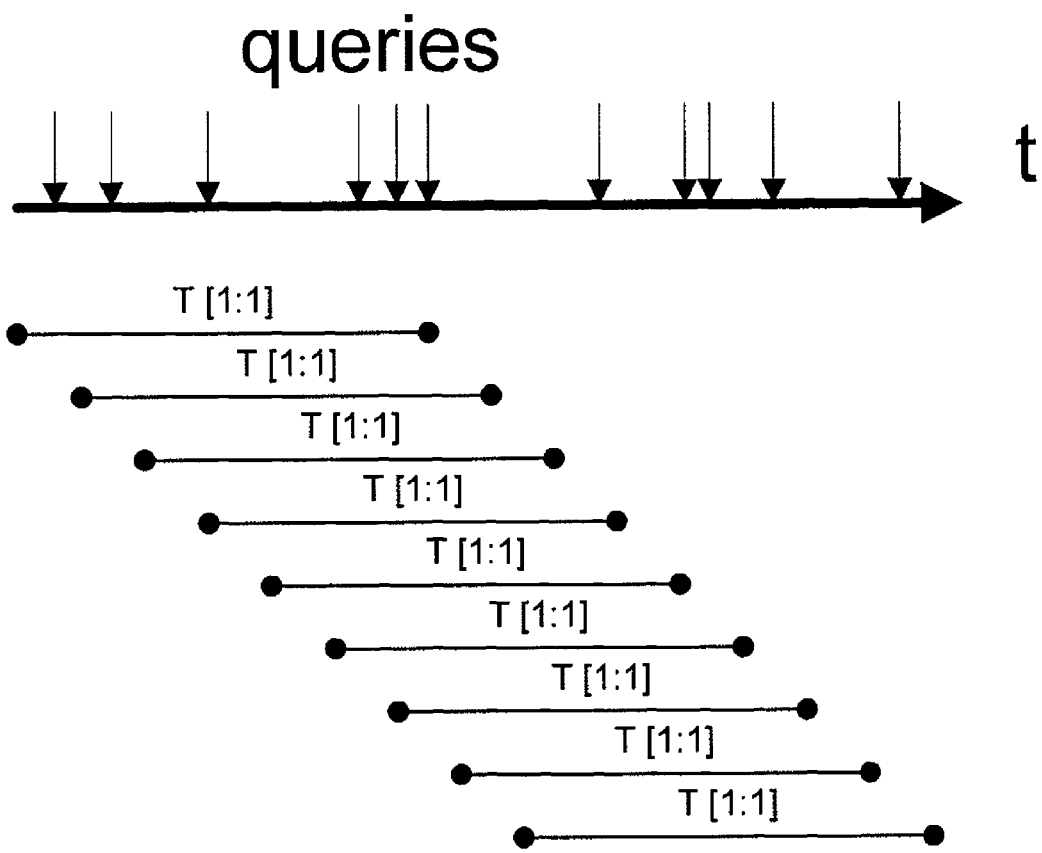
FIG. 2 is a diagram showing a time domain discretization technique for processing user queries.

Unlike INF1, $INF_i2$ is calculated for any time slot i, as illustrated by the time domain discretization graph shown in FIG. 2. $INF_i2$ is between 0 and 1 until $(H_{max}-H_i)/H_{max}$ reaches the threshold value C. When $INF_i2$ equals C, there is a lack of entropy around Φ and sending multiple queries involving Φ can lead to an inference. Therefore, at this time $INF_i2$ starts counting the new queries. After $INF_i2$ passes a number of queries, say K, the system takes an appropriate action such as dynamic blurring. We consider discrete finite duration T for past queries since humans don't have a perfect memory. Thus, we assume they forget the answers to queries sent more than T time units ago. However, to protect the system against inference attacks, the calculation and results can be extended for T→∞. Obviously, if time slots i and j overlap, rejecting a query based on $INF_i2$ affects the value of $INF_i2$.

Privacy Threshold Calculation Engine 12c

Since $H_{max}$ is fixed for each application, the value of INF1 in a specific application depends only on $H_c$. We can set the value of $H_{max}$ in each application in such a way that any given value of INF1 means the same inference chance independent of the application. By selecting the appropriate $H_{max}$ for any given application, based on equation (1), when INF1 is too high, say larger than C, $H_c$ is lower than an associated threshold in the related application:

$$IMF1 > C \Rightarrow H_c < H_{max}(1-C) \Rightarrow \text{threshold} = H_{max}(1-C) \quad (4)$$

There are different ways to use estimated thresholds of information entropy to protect users' privacy. One way is to use privacy preferences set by a user or a group of users to calculate the threshold as stated in equation (4). Such a calculation is performed by the privacy threshold calculation engine 12c, and stored in the data store 14.

It is also possible to provide individuals or groups with ways of setting new privacy preferences that directly relate to inference control. One example of inference-related privacy settings is setting desired degree of anonymity in anonymous on-line communications and CMC. There are more ways to evaluate the information entropy threshold based on privacy policies: conventional privacy preferences set by a user or a group, system administrators' policies, or legal and social norms may influence. If revealing a piece of information makes the inference function higher than the threshold, revealing the information can violate the user's privacy settings.

Risk Minimization Engine 12d

The risk minimization engine 12d executes any of the following procedures when the information entropy modeled by the engine 12b exceeds the privacy threshold calculated by the engine 12c:

a. Instantiate and deploy software policies for users, groups and/or administrators that disallow the exchange of information beyond threshold levels. Such automatic protection could be achieved by:
   Automatic reduction of the precision/granularity of the information to be revealed
   Automatic blocking of the information to be revealed such as rejecting the third party's queries
b. Alert users to the privacy risks associated with various user actions based on a calculation of information entropy:
   Visual alerts on the phone or the desktop: for example a pop-up, a small window, flashes, or change in the color or brightness of the screen which warns a user or a group of users that they are about to pass their threshold.
   Auditory alerts on the phone or the desktop such as buzzes or any sound that informs an individual or a group of users of the risks they are taking.
   Vibration of the phone or the device in risky situations.
c. Providing users with information as to their current information entropy. This could be in the form of a continuous visualization of their entropy level (such as their degree of anonymity) on the phone or on the desktop as a tab, menu, or a log box.
d. Providing users with a log(history) of the information they have revealed and how it has affected their entropy.
e. Reminding users about their current privacy preferences when they are about to communicate or exchange information (visual or auditory reminders).
f. User policy adjustments and enactment: let the individual or a group of users change their privacy settings if they get a warning or observe a risk and act based on the new privacy settings.
g. Adjusting system administrative policies if it can reduce the inference chance and acting based on the new policies.

Figure 3:
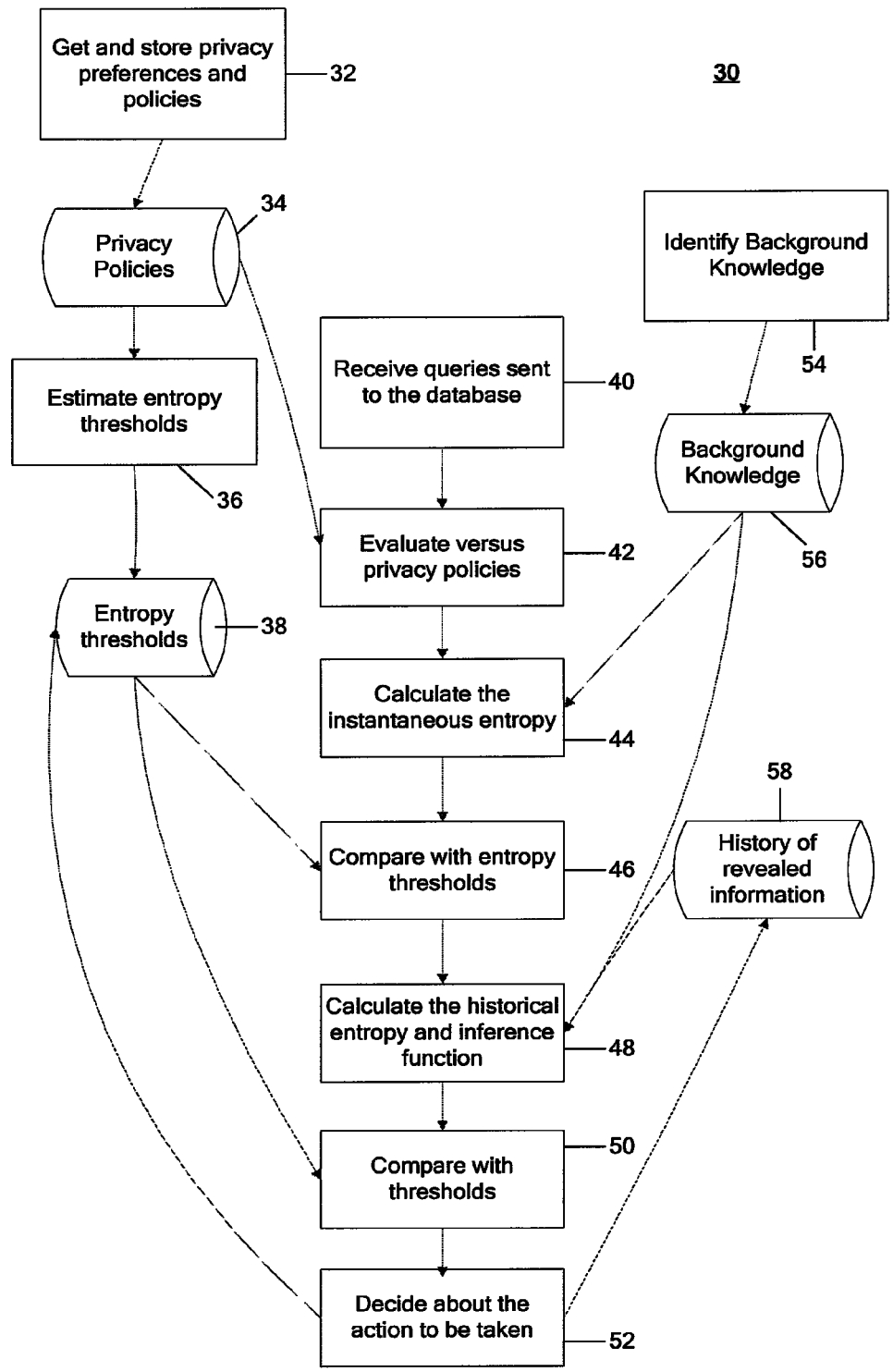
FIG. 3 is flowchart showing processing steps implemented by the present invention for protecting user privacy by mitigating social inferences.

FIG. 3 is a flowchart showing overall processing steps, indicated generally at 30, implemented by the present invention to protect user privacy by mitigating social inferences. The steps shown in FIG. 3 are executed by the modules 12a-12d discussed above in connection with FIG. 1. Beginning in step 32, the context modeling engine 12a determines and stores privacy preferences and user policies associated with one or more of the computing devices 24a-24d. Also, the privacy preferences and user policies could be determined by a system operator or other individual. This information is then stored in a privacy policy database table 34. In step 36, entropy thresholds which are calculated by 12c are stored in database 38.

In step 40, the system 10 receives queries for information from the computing devices 24a-24d, and stores the queries in the data store 14. In step 42, the queries are evaluated relative to the privacy policies stored in the table 34. In step 44, the instantaneous information entropy is then calculated using the information entropy modeling engine 12b. Also, in step 44, background knowledge stored in table 56 and determined in step 54 is processed. In step 46, the entropy thresholds in the table 38 are compared with the entropy calculated in step 44. In step 48, the module 12b calculates the historical information entropy of one or more user attributes corresponding to one or more users of the networks 22a-22b, and the inference function. Also, in step 48, background knowledge stored in table 56 and determined in step 54 by the context modeling engine 12a is processed, as well as a table 58 containing a history of revealed information corresponding to the user. In step 50, the calculated historical entropy thresholds and historical inference functions are compared with their thresholds stored in the table 38. Finally, in step 52, a decision is made based upon the comparison as to which action to take to protect the user's privacy (e.g., one or more of the actions discussed above in connection with the risk minimization engine 12d). This information is then stored in table 58 containing a history of revealed information, which can also be processed in step 48 for future calculations. It is noted that the tables 34, 38, 56, and 58 could form part of the data store 14.

Figure 4:
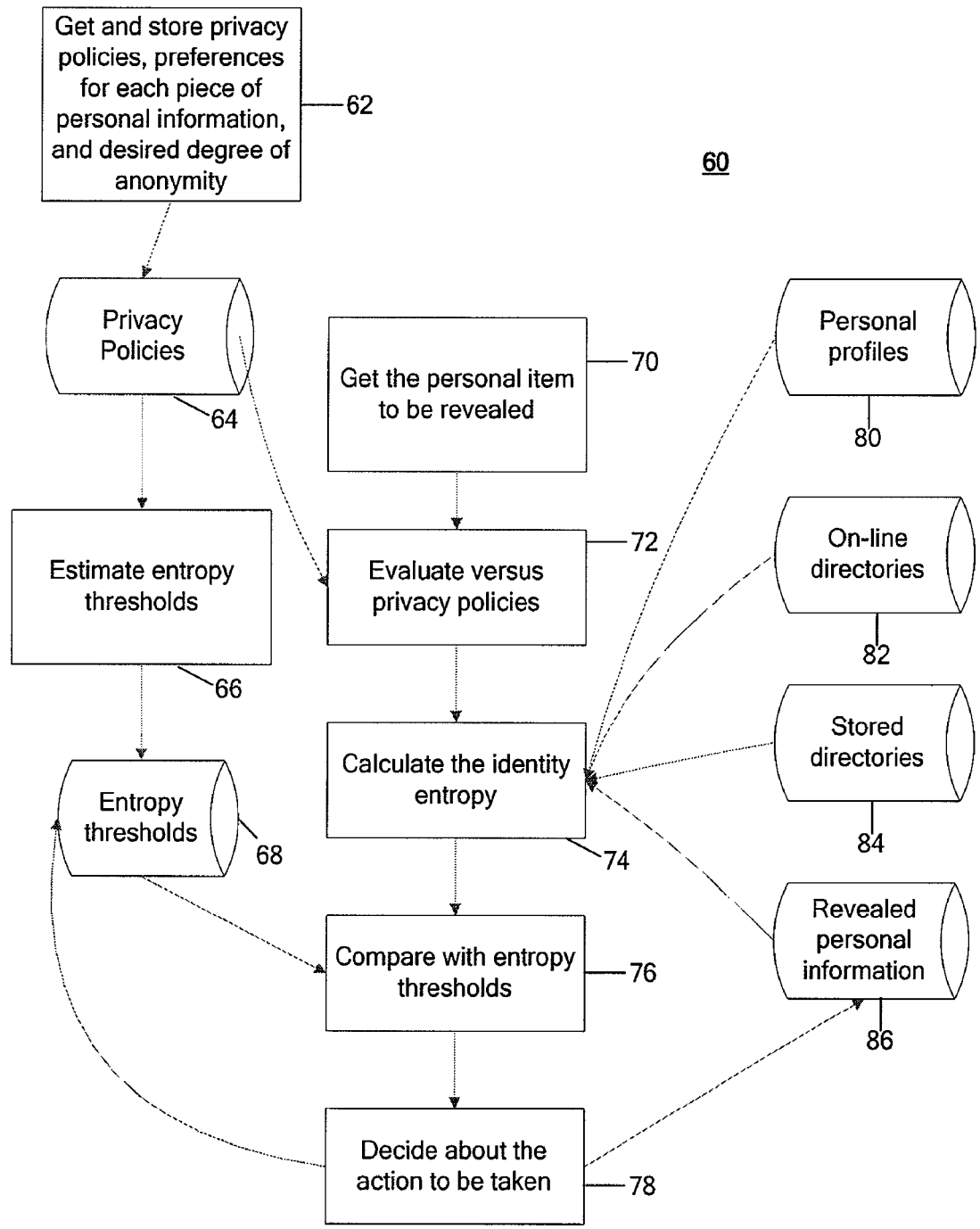
FIG. 4 is a flowchart showing processing steps according to the present invention for protecting user privacy in a computer-mediated environment.

FIG. 4 is a flowchart showing processing steps according to the present invention, indicated generally at 60, for protecting user privacy in a computer-mediated communication environment. These steps are executed by the software modules 12a-12d of FIG. 1. As an example of privacy protection in computer-mediated communication, assume that users A and B are anonymously communicating to get to know each other (for example because they are matched). They start by revealing their personal and profile information and continue until they decide to completely introduce or leave the chat. If any of them reveals information that reduces any piece of their information entropy, such as their identity, it can be inferred by the partner. For example, if A reveals that he is a Hispanic female soccer player and there is only one Hispanic female soccer player in their community, B can infer A's identity.

In step 62, privacy policies associated with users of one or more of the mobile computing devices 24a-24d are determined and stored in a privacy policy table 64, as well as preferences that the users have for each piece of personal information, and a desired degree of anonymity specified by the users. In step 66, information entropy thresholds are estimated, using the engine 12c. The estimated entropy levels are then stored in table 68. In step 70, the system 10 determines an item of personal information associated with one or more of the users, which the user is about to reveal. In step 72, the privacy policies in the table 64 are evaluated relative to the personal information about to be revealed. In step 74, the identity entropy of the information is calculated using the engine 12b. In this step, additional information about the user and his/her environment stored in stables 80-86, such as personal profiles, on-line directory information, stored directory information, and revealed personal information, is also processed during the calculation. In step 76, the results of the calculation are compared with the stored entropy thresholds in the table 68. Then, in step 78, the risk minimization engine 12d makes a determination as to which action to take (e.g., one or more of the privacy actions discussed above) to protect the user's privacy. This determination is then stored in the table 86. It is noted that the tables 64, 68, 80, 82, 84, and 86 could be part of the data store 14.

Figure 5:
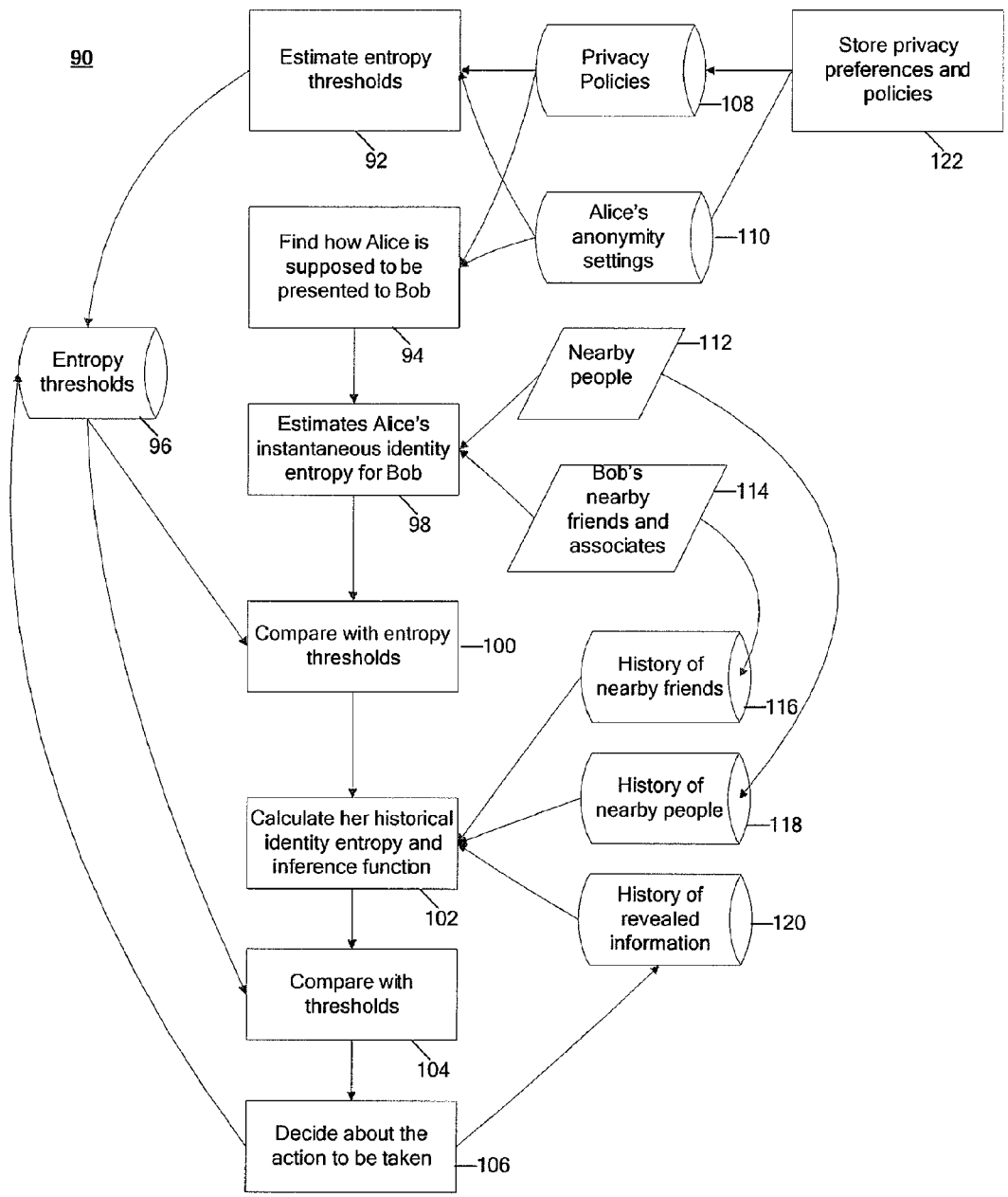
FIG. 5 is a flowchart showing processing steps according to the present invention for protecting user privacy in co-presence and proximity-based applications.

FIG. 5 is a flowchart showing processing steps according to the present invention, indicated generally at 90, for protecting user privacy in co-presence and proximity-based applications. These steps are executed by the modules 12a-12d of FIG. 1. As mentioned earlier, in co-location and proximity-based applications, users have visual knowledge about their vicinity, memory of the visual knowledge of their vicinity, and some knowledge of their acquaintances' personal profiles. For example, assume that Alice is in Bob's vicinity and they don't know each other. If there are no other females near Bob and he is told that "Alice" or "a female looking for romance" is there, he will infer that she is the only girl he sees in the room. Even if Alice has the option to set her privacy settings, she may not be able to predict all these risks. Therefore, after her privacy preferences are set and stored in a database as well as other privacy policies, inference thresholds are calculates based on these privacy policies, (e.g., Alice's identity threshold can be calculated based on her desired degree of anonymity). These thresholds can be stored in an inference management database. Bob's background knowledge related to his vicinity is then estimated and Alice's information entropy is calculated based on that. The next step is to take possible risk minimization actions. For example, if Alice's instantaneous or historical identity entropy is less than her identity entropy threshold, the system can blur the information shown to Bob so that Bob is presented with an "anonymous user" instead of "Alice" or a "female looking for romance".

In step 92, entropy thresholds are estimated by the engine 12c. This information is also used in step 92 to estimate entropy thresholds, and the estimations are stored in table 96. Also, in step 94, a determination is made as to how one person (e.g., Alice, in the example above) is to be presented to another person (e.g., Bob). This determination is made by referring to the policy and anonymity information stored in tables 108 and 110 (which, optionally, could be determined and stored in the tables 108 and 110 using a dedicated privacy policy capture engine forming part of the system 10 of the present invention). In step 98, estimates of the person's (e.g., Alice's) instantaneous identity entropy are made by the engine 12b, with references to nearby people 112 and the other person's (e.g., Bob's) nearby friends and associates 114 (historical information about which is also stored in tables 116 and 118, respectively).

In step 100, the estimated instantaneous identity entropy is compared with the entropy thresholds stored in the table 96. In step 102, the historical identity entropy of the person (e.g., Alice), as well as the inference function, is calculated based upon the historical information stored in the tables 116 and 118 and a history of information revealed about the person and stored in table 120. In step 104, the estimated historical identity entropy and the historical inference function are then compared with their thresholds stored in the table 96. Finally, in step 106, one or more of the actions discussed above is taken by the risk minimization engine 12d to protect the user's privacy. This information is also stored in the table 120. It is noted that the tables 96, 108, 110, 116, 118, and 120 could be part of the data store 14.

FIG. 6 is a flowchart showing processing steps according to the present invention, indicated generally at 130, for protecting user privacy during handing of queries for information issued by users. In step 132, a query for information is received by the system 10 by one or more users of the mobile computing devices 24a-24d. Then, in step 134, a determination is made as to whether the answer to the query violates user privacy policies. If so, the answer is rejected or blurred (i.e., part of the answer is hidden so as to preserve user privacy). Otherwise, in step 138, a determination is made as to whether there is a high chance of an instantaneous inference being made based upon the answer. If a positive determination is made, step 140 occurs; otherwise, step 144 occurs.

In step 140, a determination is made as to whether the instantaneous inference violates privacy preferences of the user. If a positive determination is made, step 142 occurs, wherein the answer is blurred. Otherwise, step 144 occurs. In step 144, a determination is made as to whether there is a high chance of an inference being made based upon historical information. If a positive determination is made, step 146 occurs; otherwise, step 150 occurs, wherein the query is answered completely. In step 146, a determination is made as to whether the inference violates the user's privacy preferences. If a positive determination is made, step 148 occurs, wherein the answer is blurred. Otherwise, step 150 occurs, wherein the query is answered completely.

To evaluate the impact of query rejection on system usability, simulations of scenarios and sequences of events for location-aware applications and computer-mediated communication were performed. In location-aware applications, less than ten percent of queries would not be accepted if the user didn't want to be exactly identified. Furthermore, instead of rejecting a query, the precision of disclosed information about can be reduced (for example, location can be shown at building level instead of room level). Therefore, location-related inferences can be automatically managed by blurring or rejecting the queries without greatly degrading system usability. However, inferences in computer-mediated communications can happen more frequently and users would like to be able to reveal their information if they are willing to do so. In such applications this concern can be addressed by providing users with visualizations of the risk so that they can make informed information exchange decisions.

Figure 7A:
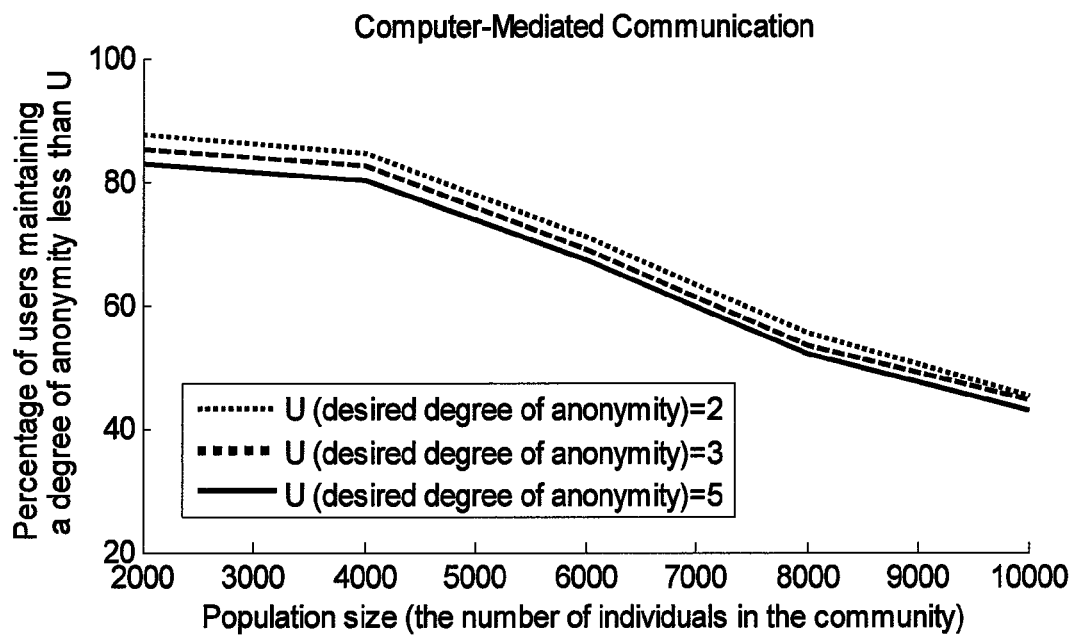
FIGS. 7A-7D are simulation results showing various privacy risks associated with computer-mediated communications systems.

FIGS. 7A-7D are simulation results showing various privacy risks associated with computer-mediated communication (CMC) systems. FIG. 7A shows the probability that a user's identity entropy is lower than its threshold. The y-axis shows the percentage of users for whom entropy was less than the threshold. The x-axis was chosen to represent the population because the size of the community highly affects the inference probability. The depicted curves show this probability for desired degrees of anonymity of 2, 3, and 5 (entropy thresholds were calculated based on U=2, U=3, and U=5). In a user study, 80.8% of the users who wanted to stay anonymous desired a degree of anonymity of two: U=2; and 5.1% of them desired a degree of anonymity of three: U=3. As expected, increasing the population decreases this probability. As the figure shows, while in a small school the risk can be very high, in a campus of 10,000 students, it is still about 50% in online chats between students. This means even in a rather big school, users reveal information that 50% of the time could lead to the invasion of their desired degree of anonymity. Therefore, identity inferences can be quite prevalent in CMC.

Figure 7B:
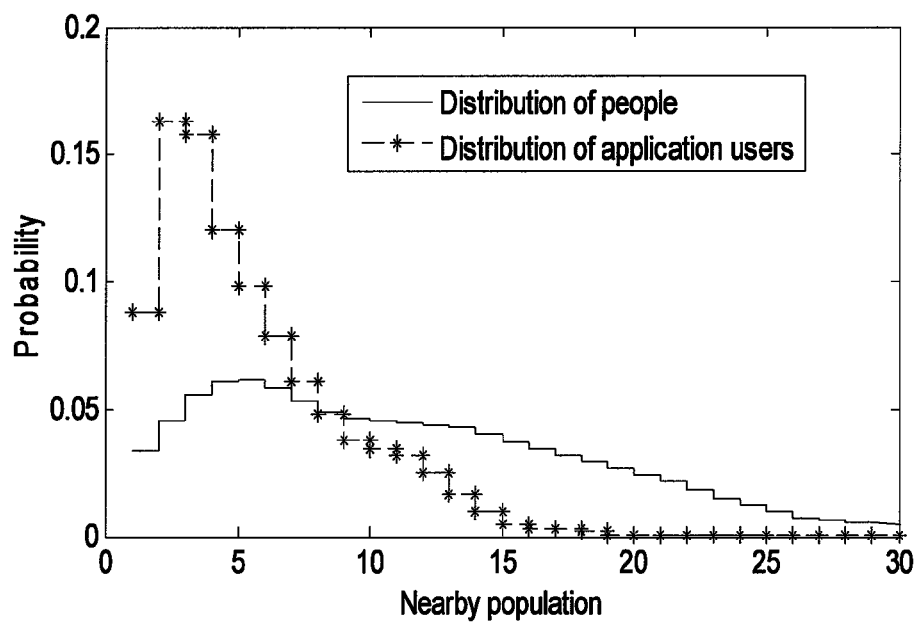

FIG. 7B shows simulation results of a proximity-based application that shows nearby users by their nickname or real name based on nearby users' privacy preferences. Anonymity invasions (identity inferences) happen when a user's real name or nickname is mapped to the person or a few individuals using their nearby presence. Population density and distribution of nearby people has an important impact on the inference risk. Based on the results, the mean of the number of people that subjects saw in their vicinity was 9.1 and its distribution is shown in FIG. 7B. Among Poisson, Gaussian, exponential, Gamma, Lognormal, and Negative Binomial distributions, this distribution best fit the Negative Binomial distribution. We also measured the number of application users collected by the nearby application in the vicinity of each subject at each situation. The average number of nearby application users was 3.9 and probability distribution is shown in FIG. 7B. These two measures are highly correlated (N=167, correlation coefficient, _=0.92; statistical significance, p<0.001) and the number of nearby people can be estimated as a linear function of the number of nearby application users with $rms_{err}$=1.6. Subjects' answers show that their background knowledge mostly consists of their visual information about their vicinity and presence of nearby users. Therefore, significant information available to the inferrer includes the names shown by the application and physical appearance of current and past nearby users.

Figure 7C:
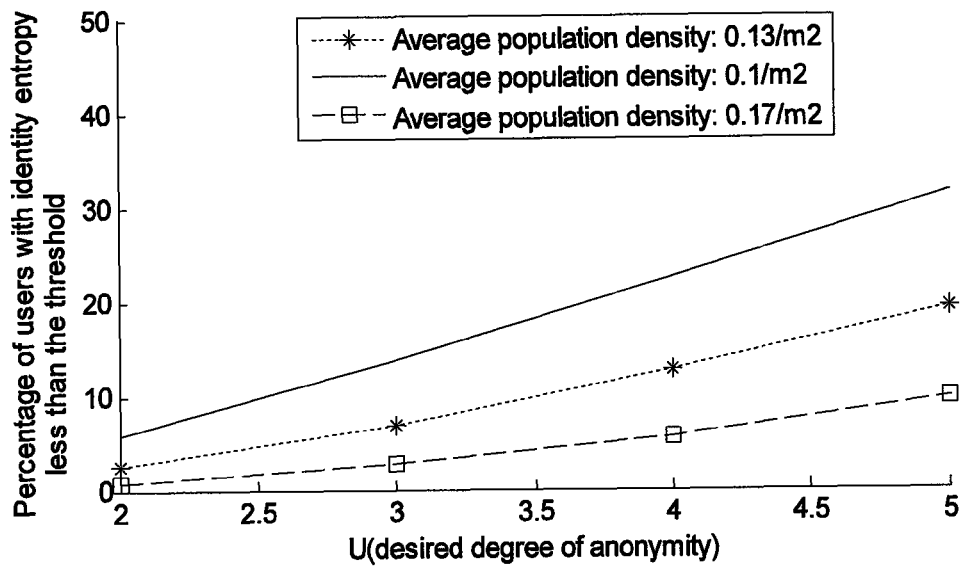

FIG. 7C shows the probability that a user is at the risk of instantaneous identity inference in a proximity-based application. The y-axis shows the percentage of users whose identity entropy was lower than its threshold. Entropy threshold was calculated based on their desired degree of anonymity, U using the entropy equation. The x-axis represents the desired degree of anonymity. Each curve depicts the risk for a different mean of nearby population density. The average density in the middle curve is equal to the average density of our experimental data. It can be seen that, assuming mass usage, the risk of identity inference is about 7% for a desired degree of 3, and 20% for a desired degree of anonymity of 5. As expected more crowded environments have a lower chance of being at the identity inference risk.

Figure 7D:
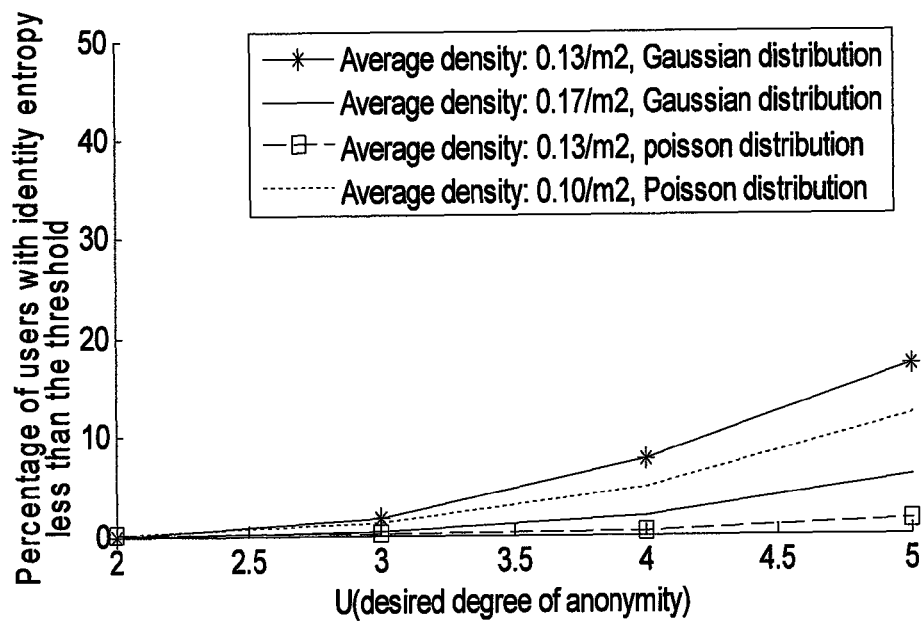

FIG. 7D shows the same risk for two more general nearby distributions; Gaussian distribution and a completely random spatial distribution of people (Poisson distribution). Again, it can be seen that the risk is less than 30% in the worst case, which is for a desired degree of anonymity of 5 and an environment that is 30% less populated than our campus. These results are also confirmed by the results that we obtained from the user experiment. Simulation of the risk of historical inferences and experimental results show that for a given population density, historical inferences happen less frequently than instantaneous inferences.

Figure 8:
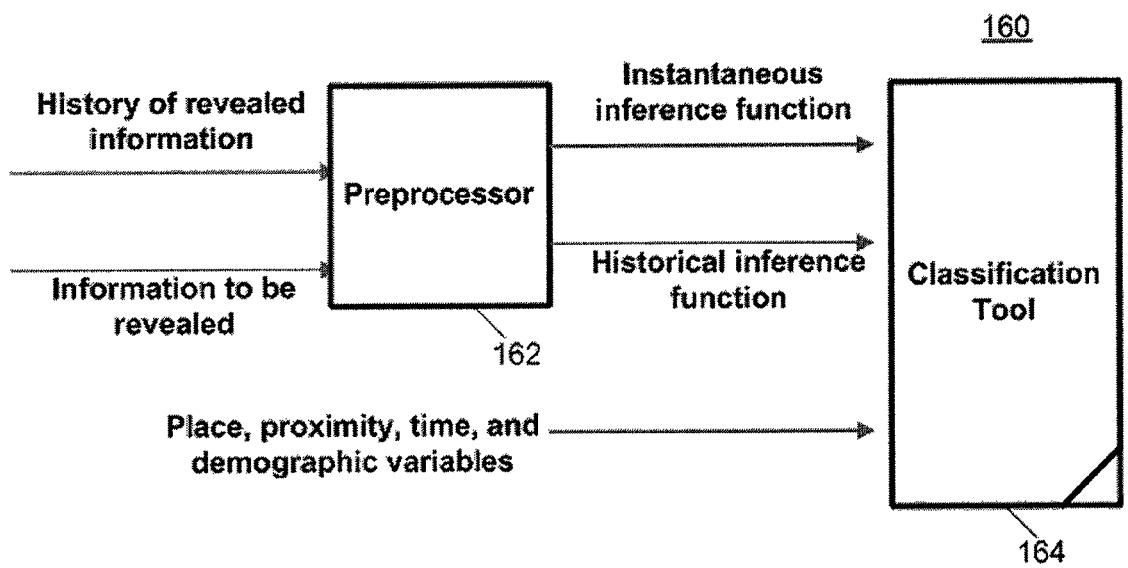
FIG. 8 is a diagram showing a classification tree system according to the present invention for modeling user context information.

FIG. 8 is a diagram showing a classification tree system, indicated generally at 160, that can be implemented to model user context data, as well as to estimate inference risks. The system 160 includes a preprocessor software module 162 which processes a history of revealed user information and information to be revealed about a user, and a tree classification software tool 164 which processes an instantaneous inference function and a historical inference function generated by the preprocessor 162, as well as place, proximity, time, and demographic variables. The tress can be generated automatically using MatLab. Gini's diversity index can be used to choose an outgoing branch. For reliability purposes, nodes may have 100 or more observations to be split.

Figure 9:
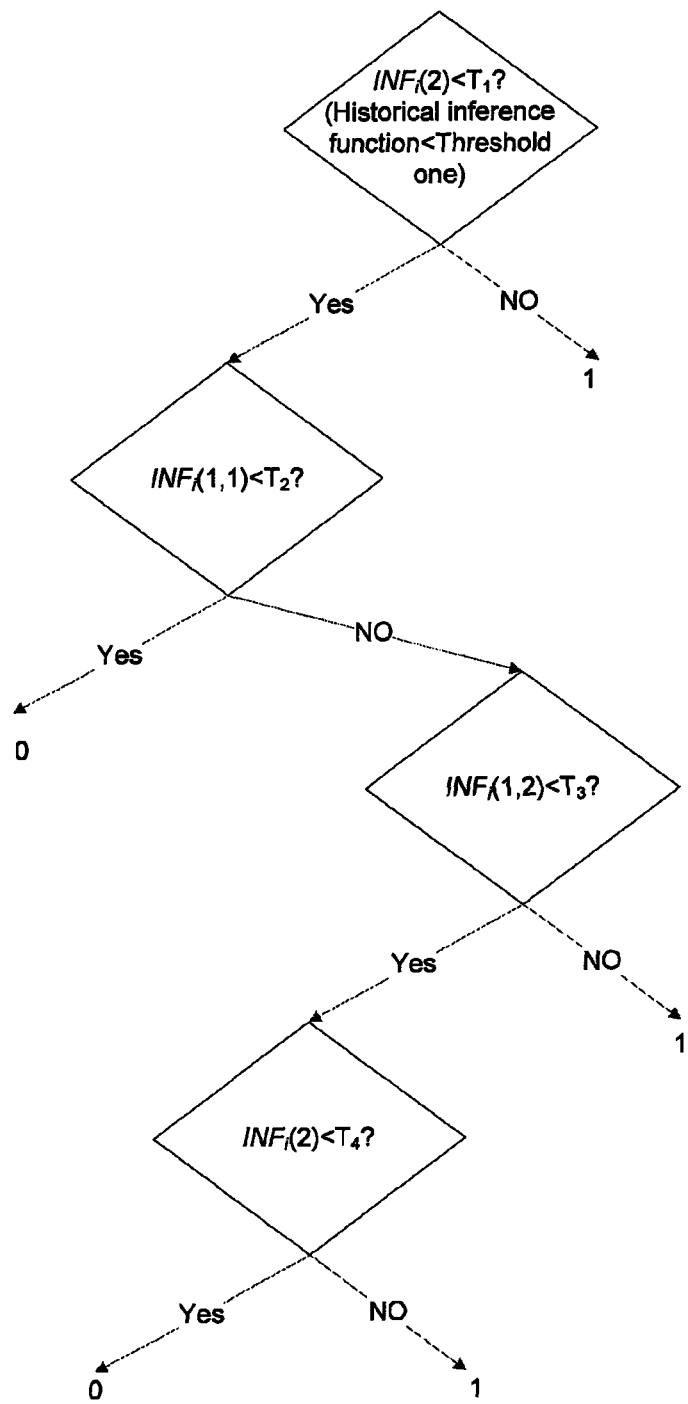
FIGS. 9-11 are diagrams showing classification results modeled by the system of FIG. 8.
Figure 10:
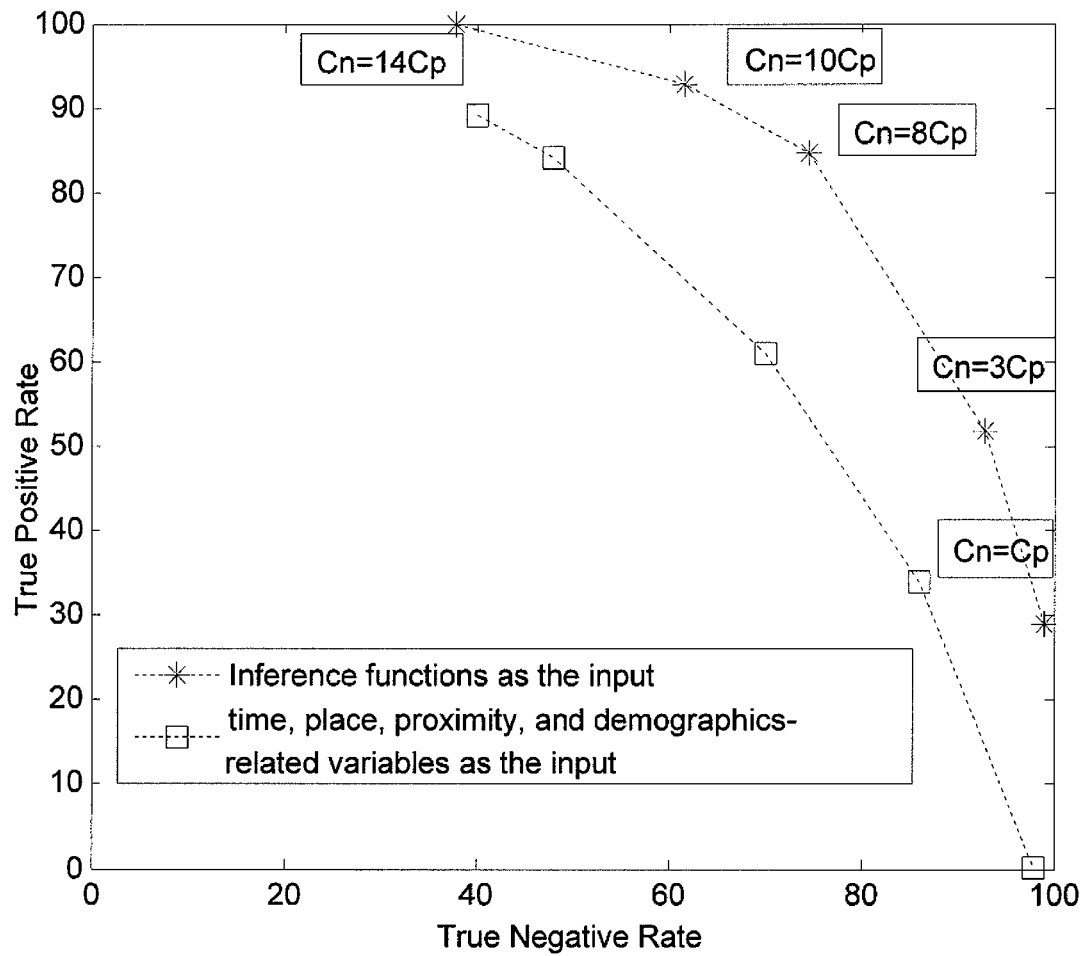
Figure 11:
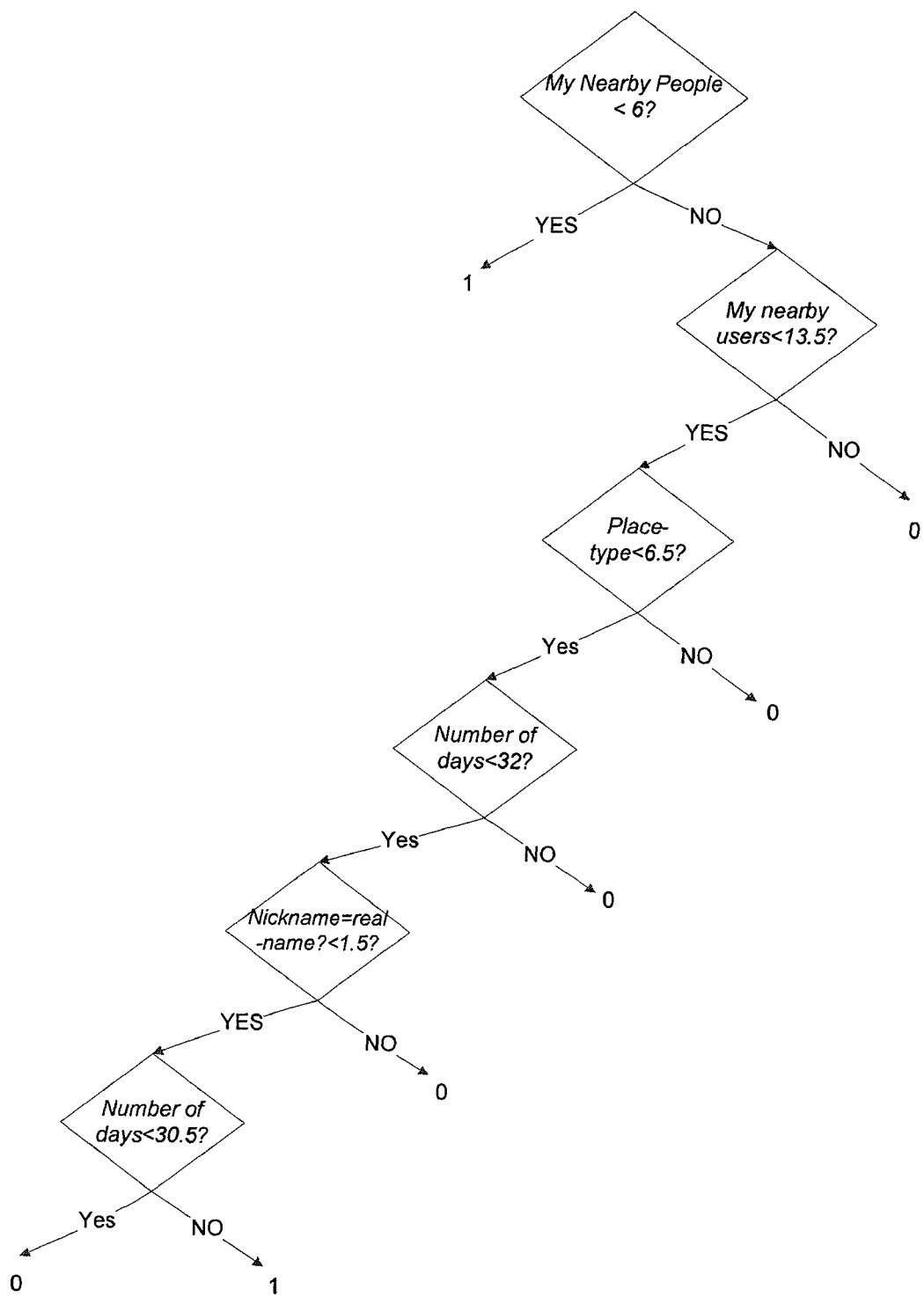

FIGS. 9-11 are diagrams showing classification results modeled by the system of FIG. 8. In a trial run, two instantaneous inference functions were produced: inst_inf_1 is the value of the instantaneous inference function ($INF_1(Q \rightarrow \Phi)$) where the number of possible values for a nearby user's identity, V, is set to the number of nearby users using the application. inst_inf_2 is the value of the instantaneous inference function where the number of possible values for a nearby user's identity, V, is set to the number of all nearby people. The value of the historical inference function, hist_inf, was calculated considering the history of co-proximity of the subject and the nearby user, up to two weeks prior.

First, only inference functions were used as independent variables. The tree structure and the rate of correct classifications changes based on the ratio of the cost for false positives (A false positive is when no inferences happened in a situation but the tree classified the situation as high risk), $C_P$, and false negatives (A false negative is when an identity inference happened in a situation but the tree classified the situation as normal.), $C_n$. We changed the cost of false negatives, $C_n$ as compared to the cost of false positives, $C_P$, and obtained the upper curve depicted in FIG. 10. As shown in the figure, for $C_n$=8.$C_P$ the true positive rate is 85% and the true negative rate is 74%. Since correct guesses were made rarely with the questionnaires (about 12%), the false negative must be given a higher cost to produce a large true positive rate. An instance of the tree for $C_n$=6.$C_P$ is shown in FIG. 9. This tree uses the inference functions both individually and in combination. The tree basically means that the situation is of high risk if either the instantaneous or the historical inference is too high (hist_inf>threshold T1 or inst_inf>threshold T2), or they are both relatively high (hist_inf>T4 or inst_inf>T2 where T4<T1).

In the second phase, only the time-, place-, and proximity-related information and demographic features were used as independent variables. It is noted that the proximity-related features include the number of nearby application users and the number of nearby people; the latter implies the number of possible values for a user's identity, V, in calculating the instantaneous inference functions. However, no feature directly measures the historical inference function. Correct classification rate of the decision tree versus different values of $C_n$ is shown in the lower curve in FIG. 10. As shown in FIG.

10, for a given true negative rate, the true positive rate is on average 30% lower than the true positive rate in the previous phase.

An instance of the tree for $C_n=6.C_P$ is shown in FIG. 11. It has a higher depth than the tree obtained in phase one. In the final phase, all five categories of variables in both previous phases were used as independent variables. The difference in the success rate was less than 0.5%.

Having thus described the invention in detail, it is to be understood that the foregoing description is not intended to limit the spirit or scope thereof. What is desired to be protected is set forth in the following claims.

What is claimed is:

1. A method for protecting individual privacy in a computer network, comprising the steps of:
    providing a computing device in communication with a network;
    modeling a context associated with a user of the computing device and storing the modeled context in a data store;
    calculating an information entropy level associated with the user using the computing device;
    storing the calculated information entropy level in a data store of the computing device;
    calculating a privacy threshold associated with the user using the computing device;
    storing the calculated privacy threshold in the data store of the computing device; and
    implementing at least one privacy protection action based upon the modeled context, the calculated information entropy level, and the calculated privacy threshold.

2. The method of claim 1, wherein the step of modeling the context comprises implementing a deterministic model of background information associated with the user.

3. The method of claim 1, wherein the step of modeling the context comprises implementing a probabilistic model of background information associated with the user.

4. The method of claim 1, wherein the step of modeling the context comprises modeling vicinity information about the user's vicinity including at least one of names of nearby persons, profiles of nearby persons, and information about nearby locations.

5. The method of claim 1, wherein the step of modeling the context comprises modeling personal information about people nearby the user including at least one of user demographic information, publicly-available information about the people, gender information, and ethnicity information.

6. The method of claim 1, wherein the step of calculating the information entropy level comprises implementing an instantaneous entropy model which models at least one of instantaneous information entropy and instantaneous identity entropy.

7. The method of claim 1, wherein the step of calculating the information entropy level comprises implementing a historical entropy model which models at least one of historical information entropy and historical identity entropy.

8. The method of claim 1, wherein the step of calculating the information entropy level comprises determining and storing information about at least one of privacy preferences, anonymity preferences, group privacy preferences, system administrator settings, legal requirements, or social customs.

9. The method of claim 1, wherein the step of implementing the at least one privacy protection action includes at least one of blurring an answer to a user query for information, rejecting an answer to a user query for information, alerting a user as to a privacy risk, informing the user about a current entropy level, informing the user about a history of revealed information, reminding the user about current privacy settings, adjusting the user's privacy settings, and adjusting system administration policy settings.

10. A method for protecting individual privacy in a computer network, comprising the steps of:
    modeling a context associated with a user of the a computing device in communication with a network and storing the modeled context in a data store;
    calculating an information entropy level associated with the user using the computing device;
    storing the calculated information entropy level in a data store of the computing device;
    calculating a privacy threshold associated with the user using the computing device;
    storing the calculated privacy threshold in the data store of the computing device; and
    implementing at least one privacy protection action based upon the modeled context, the calculated information entropy level, and the calculated privacy threshold.

11. The method of claim 10, wherein the step of modeling the context comprises implementing a deterministic model of background information associated with the user.

12. The method of claim 10, wherein the step of modeling the context comprises implementing a probabilistic model of background information associated with the user.

13. The method of claim 10, wherein the step of modeling the context comprises modeling vicinity information about the user's vicinity including at least one of names of nearby persons, profiles of nearby persons, and information about nearby locations.

14. The method of claim 10, wherein the step of implementing the at least one privacy protection action includes at least one of blurring an answer to a user query for information, rejecting an answer to a user query for information, alerting a user as to a privacy risk, informing the user about a current entropy level, informing the user about a history of revealed information, reminding the user about current privacy settings, adjusting the user's privacy settings, and adjusting system administration policy settings.

\* \* \* \* \*